US011057749B2

(12) United States Patent
Lee et al.

(10) Patent No.: US 11,057,749 B2
(45) Date of Patent: Jul. 6, 2021

(54) METHOD AND APPARATUS FOR PROVIDING MESSAGE SERVICE IN MOBILE COMMUNICATION SYSTEM

(71) Applicant: Samsung Electronics Co., Ltd., Suwon-si (KR)

(72) Inventors: Dongkyu Lee, Suwon-si (KR); Hangsuk Huh, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 60 days.

(21) Appl. No.: 16/078,483

(22) PCT Filed: Feb. 21, 2017

(86) PCT No.: PCT/KR2017/001872
§ 371 (c)(1),
(2) Date: Aug. 21, 2018

(87) PCT Pub. No.: WO2017/146434
PCT Pub. Date: Aug. 31, 2017

(65) Prior Publication Data
US 2019/0104390 A1  Apr. 4, 2019

(30) Foreign Application Priority Data

Feb. 22, 2016 (KR) .................. 10-2016-0020627

(51) Int. Cl.
*H04W 4/14* (2009.01)
*H04W 88/18* (2009.01)
(Continued)

(52) U.S. Cl.
CPC ............ *H04W 4/14* (2013.01); *H04W 8/02* (2013.01); *H04W 8/08* (2013.01); *H04W 60/06* (2013.01);
(Continued)

(58) Field of Classification Search
None
See application file for complete search history.

(56) References Cited

U.S. PATENT DOCUMENTS 8,861,496 B2  10/2014  Yu et al.
2005/0282565 A1* 12/2005 Shaheen ............... H04L 51/38
455/466

(Continued)

FOREIGN PATENT DOCUMENTS

KR  10-2006-0118211 A   11/2006
WO  2013/009008 A1      1/2013
WO  2014-169950 A1     10/2014

OTHER PUBLICATIONS

3rd Generation Partnership Project; "Technical Specification Group Core Network and Terminals; Technical realization of the Short Message Service (SMS) (Release 11)"; Mar. 2013; pp. 1-206; 3GPP TS 23.040.

(Continued)

*Primary Examiner* — Kevin C. Harper
*Assistant Examiner* — Derrick V Rose
(74) *Attorney, Agent, or Firm* — Jefferson IP Law, LLP

(57) ABSTRACT

The present disclosure provides a short message service (SMS) in a mobile communication system, to thus guarantee continuity of the SMS service. According to an embodiment of the present disclosure, an operating method of a control node for providing a message service in a mobile communication system includes receiving a message from a user equipment (UE) or a message delivery center, determining an active or inactive state of the message service using a first interface, and if the message service using the first interface is disabled, transmitting detach request information for re-attach of the UE to the UE.

10 Claims, 14 Drawing Sheets

(51) Int. Cl.

| | |
|---|---|
| *H04W 60/06* | (2009.01) |
| *H04W 88/14* | (2009.01) |
| *H04W 92/24* | (2009.01) |
| *H04W 8/02* | (2009.01) |
| *H04W 76/19* | (2018.01) |
| *H04W 8/08* | (2009.01) |
| *H04W 64/00* | (2009.01) |
| *H04W 88/02* | (2009.01) |

(52) U.S. Cl.
CPC ......... *H04W 64/003* (2013.01); *H04W 76/19* (2018.02); *H04W 88/02* (2013.01); *H04W 88/14* (2013.01); *H04W 88/184* (2013.01); *H04W 92/24* (2013.01)

(56) References Cited

U.S. PATENT DOCUMENTS

| | | | | |
|---|---|---|---|---|
| 2010/0081435 | A1* | 4/2010 | Huang | H04W 60/00 455/435.1 |
| 2014/0016614 | A1* | 1/2014 | Velev | H04W 4/70 370/331 |
| 2014/0287752 | A1 | 9/2014 | Stojanovski | |
| 2015/0045044 | A1* | 2/2015 | Liu | H04W 4/70 455/450 |
| 2015/0230166 | A1* | 8/2015 | Casati | H04W 36/12 370/328 |

OTHER PUBLICATIONS

3rd Generation Partnership Project; "Technical Specification Group Services and System Aspects; Support of Short Message Service (SMS) over generic 3GPP Internet Protocol (IP) access; Stage 2 (Release 11)"; Sep. 2013; pp. 1-55; 3GPP TS 23.204.

3rd Generation Partnership Project; "Technical Specification Group Services and System Aspects; Circuit Switched (CS) fallback in Evolved Packet System (EPS); Stage 2 (Release 11)"; Jun. 2015; pp. 1-99; 3GPP TS 23.272.

3rd Generation Partnership Project; "Technical Specification Group Services and System Aspects; General Packet Radio Service (GPRS) enhancements for Evolved Universal Terrestrial Radio Access Network (E-UTRAN) access (Release 11)"; Dec. 2014; pp. 1-286; 3GPP TS 23.401.

3rd Generation Partnership Project; Technical Specification Group Core Network and Terminals; Point-to-Point (PP) Short Message Service (SMS) support on mobile radio interface (Release 11); Sep. 2012; pp. 1-127; 3GPP TS 24.011.

* cited by examiner

METHOD AND APPARATUS FOR PROVIDING MESSAGE SERVICE IN MOBILE COMMUNICATION SYSTEM

TECHNICAL FIELD

This disclosure relates to a method and an apparatus for providing a message service in a mobile communication system.

BACKGROUND ART

A short message service (SMS) of a Long Term Evolution (LTE) system has been provided through SMS over SGs functionality which uses a circuit switched (CS) domain of a 3th generation (3G) mobile communication network and SMS over Internet protocol (IP) functionality which uses an IP multimedia subsystem (IMS) network.

In case of the SMS over SGs functionality, since an interface of mobility management entity (MME) and short message service center (SMSC) sections are not defined, the SMS service is provide using a mobile switching center (MSC) server over a SGs interface. The MME merely forwards an SMS related message transmitted from a user equipment (UE) to the MSC server and forwards an SMS related message transmitted from the MSC server to the UE. It is necessary to register a location in the CS domain of the 3G mobile communication network for the sake of the SMS service, and the SMS service is limited if interworking with the MSC server is unavailable.

The SMS over IP functionality provides the SMS service using an IMS core network. The UE supporting a short message session initiation protocol (SMSIP) message performs an IMS registration procedure with a serving-call session control function (S-CSCF), and the UE encapsulates a short message using session initiation protocol (SIP), and transmits the encapsulated short message. The MME is merely involved in bearer setup for IMS service and is not responsible for the SMS at all. The SMS service is limited in a UE not supporting the SMSIP message.

SMS in MME functionality is new functionality added to 3th generation partnership project (3GPP) Rel. 11, and the MME provides the SMS service to a subscriber who uses only a packet switched (PS) service or a subscriber who uses only the PS and SMS services in an evolved packet system (EPS) over an enhanced-universal terrestrial radio access network (E-UTRAN) by interworking directly with the SMSC without using the MSC server. The SMS in MME functionality is an architecture option for providing the SMS service through EPS non-access stratum (NAS) signaling in a network not using GSM EDGE radio access network (GERAN) or UTRAN. The SMS in MME functionality has no changes for the UE and the E-UTRAN, and the SMS service is controlled by the MME.

DISCLOSURE OF INVENTION

Technical Problem

An embodiment provides a method and an apparatus for providing a message service in a mobile communication system.

An embodiment provides a method and an apparatus for providing a message service by changing an interface for the message service from a first interface to a second interface in a mobile communication system if the message service over the first interface is disabled.

An embodiment provides a method and an apparatus for providing a message service if a message incoming request is received from a message delivery center in a mobile communication system.

An embodiment provides a method and an apparatus for providing a message service by switching a first interface to a second interface if a failure occurs at the first interface for the message service in a mobile communication system.

Solution to Problem

According to an embodiment, an operating method of a control node for providing a message service in a mobile communication system includes receiving a message from a user equipment (UE) or a message delivery center, determining an active or inactive state of the message service using a first interface, and if the message service using the first interface is disabled, transmitting detach request information for re-attach of the UE to the UE.

According to an embodiment, an apparatus of a control node for providing a message service in a mobile communication system includes a communication unit for receiving a message from a UE or a message delivery center, and a control unit for determining an active or inactive state of the message service using a first interface, wherein, if the message service using the first interface is disabled, the communication unit transmits detach request information for re-attach of the UE to the UE.

Advantageous Effects of Invention

If a control node may not transmit a message from a UE to a message delivery center using a first interface in a mobile communication system, the control node may guarantee continuity of message transmission and reception by transmitting a detach request message for re-attach of the UE to the UE.

BEST MODE FOR CARRYING OUT THE INVENTION

Hereinafter, an operational principle of various embodiments is described in detail with reference to the accompanying drawings. In the following explanations, well-known functions or constitutions will not be described in detail if they would unnecessarily obscure the subject matter of the various embodiments. Also, terminologies to be described below are defined in consideration of functions in the various embodiments and may vary depending on a user's or an operator's intention or practice. Thus, their definitions should be defined based on all the contents of the specification.

Hereinafter, in the present disclosure, if a mobility management entity (MME) may not interwork with a short message service center (SMSC) over a SGd interface in a mobile communication system, the MME transmits to a user equipment (UE), detach request information for a re-attach procedure of the UE and receives a tracking area update (TAU) message from the UE. In the following, to ease explanations, the MME is referred to as a control node, the SMSC is referred to as a message delivery center, the TAU message is referred to as location tracking information, and the SGd interface is referred to as a first interface. The control node registers UE location information of the location tracking information in a mobile switching center (MSC) server over a SGs interface. In the following, to facilitate explanations, the SGs interface is referred to as a second interface, and the MSC server is referred to as a control server. By registering the UE location information in the MSC server over the second interface, the control node transmits a message of the UE to the message delivery center. If the control node may not interwork with a message provision system over the first interface, the control node registers the UE location over the second interface, to thus guarantee continuity of the message service.

In the following explanations, terms indicating control information, terms indicating network entities, terms indicating messages, and terms indicating components of an apparatus are exemplary to ease the explanations. Accordingly, the present invention is not limited to the terms to be described, and may use other terms having technically identical meaning.

Hereinafter, to ease explanations, some of terms and names defined in 3th generation partnership project (3GPP) Long Term Evolution (LTE) standard may be used. However, the present invention is not limited to the terms and the names, and may be identically applied to other standard system.

In various embodiments, the electronic device may be a portable electronic device, and may be one of a smart phone, a portable terminal, a mobile phone, a mobile pad, a media player, a tablet computer, a handheld computer, or a personal digital assistant (PDA). Also, the electronic device may be a device which combines two or more functions of those devices.

Figure 1:
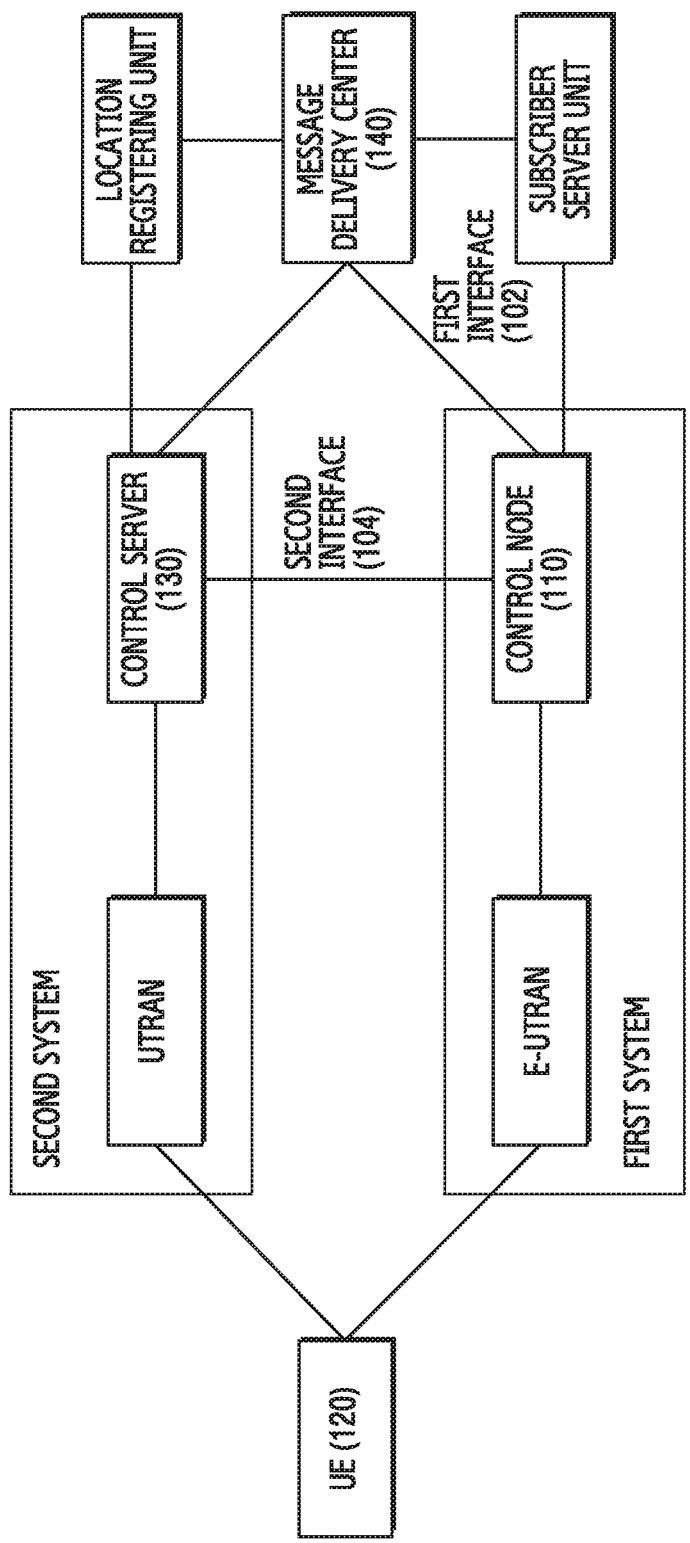
FIG. 1 illustrates a mobile communication system according to an embodiment.

FIG. 1 illustrates a mobile communication system according to an embodiment. FIG. 1 illustrates a communication environment where a UE which uses both of a wideband code division multiple access (WCDMA) network and an LTE network transmits and receives a message. Hereafter, to ease explanations, the LTE network is referred to as a first system, and the WCDMA network is referred to as a second system.

Referring to FIG. 1, a UE 120 performs communication using the first system and the second system. The first system includes an enhanced-universal terrestrial radio access network (E-UTRAN), a control node 110, and a subscriber server unit. The second system includes a UTRAN, a control server 130, and a location registering unit. Herein, the subscriber server unit is a home subscriber server (HSS), and the location registering unit is a home location register (HLR). For example, the subscriber server unit may be referred to as a subscriber server.

In the first system, the control node 110 may transmit a message from the UE 120 to a message delivery center 140 over a first interface 102. The control node 110 may transmit a message transmitted by the UE 120 to the message delivery center 140 via the control server 130 of the second system. The message transmitted by the UE 120 may be referred to as a short message, a short message service (SMS), a text message, and a short message service message. For example, the control node 110 may transmit a message from the UE 120 to the message delivery center 140 using the first interface 102. The control node 110 may receive a message from the message delivery center 140 using the first interface 102. The control node 110 may transmit a message from the UE 120 using the second interface 104. While over the first interface or over the second interface is described to ease explanations, the message transmission and reception over the first interface and the message transmission and reception using the first interface are identical operations of the control node 110. Also, the message transmission and reception over the second interface and the message transmission and reception using the second interface are identical operations of the control node 110.

If not transmitting a message transmitted by the UE 120 to the message delivery center 140 over the first interface 102, the control node 110 notifies the UE 120 that the message transmitted by the UE 120 is not transmitted to the message delivery center 140. For example, if SMS in MME functionality is disabled, the control node 110 may not transmit the message transmitted by the UE 120 to the message delivery center 140 over the first interface 102. The SMS in MME functionality may be disabled or enabled by an operator. Herein, the operator refers to an operator which provides the communication service. The control node 110 performs an SMS registration procedure of the control node 110 to the subscriber server. If the registration procedure is successful, the control node 110 does not register a location of the UE 120 over the second interface. The control node 110 may enable (ON) or disable (OFF) the SMS in MME functionality under control of the operator. If the SMS in MME functionality is switched from the on state to the off state, the control node 110 is not able to support an SMS incoming and outgoing service for a subscriber who is registered in the subscriber server. If an SMS outgoing request occurs, the UE 120, which does not know that the SMS in MME functionality of the control node 110 is disabled, transmits an SMS outgoing message to the control node 110. However, since the SMS in MME functionality of the control node 110 is disabled, the SMS outgoing message is processed as a failure at the control node 110. Since a control node number is registered as a system number for the SMS incoming in the subscriber server, if an SMS incoming request occurs, the message delivery center forwards an SMS incoming message to the control node 110 over the first interface. The control node 110, of which the SMS in MME functionality is off, processes the SMS incoming request as a failure. If the control node 110 does not proceed with a detach procedure to the UE 120 and the subscriber server, state mismatch occurs between the control node 110, the UE 120, and the subscriber server, and the problem lasts until a new attach or a tracking area update request is received from the UE 120. If not interworking with the message delivery center due to the first interface fault, the SMS incoming and outgoing for the subscriber who is registered in the subscriber server are unavailable. In a network where a network access mode (NAM) in subscriber data uses both of a circuit switched scheme and a packet switched scheme, if the location of the UE 120 is registered through a reattach procedure over the second interface, the control node 110 may enable the SMS service. For example, if determining that the SMS in MME functionality is in a communication failure state, the control node 110 may determine that the SMS in MME functionality is disabled. Determining the communication failure state shall be elucidated later. For example, the SMS in MME functionality may be message service functionality over the first interface.

The control node 110 may receive from the UE 120 a response to a notification informing that the message is not delivered. The control node 110, upon receiving the response to the notification, determines whether the UE 120 communicates using both the first system and the second system. If the UE 120 uses both of the first system and the second system, the control node 110 deletes pre-stored subscriber information. The control node 110 deletes the pre-stored subscriber information, transmits detach request information to the UE 120, and receives a response message. Next, the control node 110 receives from the UE 120, location tracking information including location information of the UE 120. The control node 110 may delete the subscriber information pre-stored in the subscriber server.

The control node 110 registers the location information of the UE 120 in the control server 130 over the second interface 104. The control server 130 registers the location information of the UE 120 in the location registering unit. For example, the first interface 102 may be the SGd interface, and the second interface may be the SGs interface. The first interface 102 may be a path for the control node 110 to exchange information with the message delivery center 140. The second interface 104 may be a communication path for the control node 110 to exchange information with the control server 130.

Figure 2:
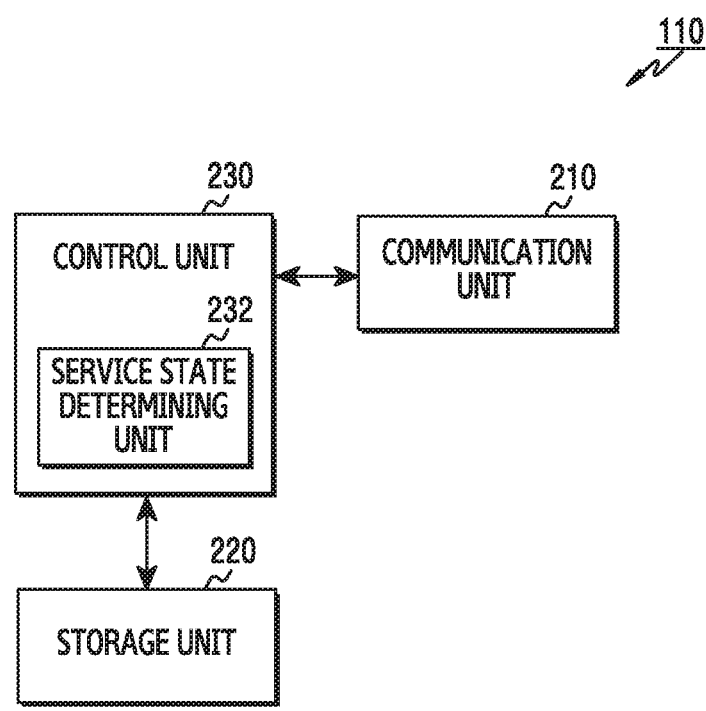
FIG. 2 illustrates a block diagram of a control node in a mobile communication system according to an embodiment.

FIG. 2 illustrates a block diagram of a control node in a mobile communication system according to an embodiment. FIG. 2 illustrates a configuration of the control node 110. A term such as 'portion' or '~ er' to be used indicates a unit for processing at least one function or operation, and may be implemented using hardware, software, or a combination of hardware and software.

Referring to FIG. 2, the control node 110 includes a communication unit 210, a storage unit 220, a control unit 230, and a service state determining unit 232.

The communication unit 210 provides an interface for communicating with other nodes in a network. That is, the communication unit 210 converts a bit stream transmitted from the control node to other node, for example, an eNodeB, a core network, or an authentication server, to a physical signal, and converts a physical signal received from other node to a bit stream. According to an embodiment, the communication unit 210, if communicating with the UE 120, and performs the communication via the eNodeB. While the following descriptions exclude the eNodeB to ease explanations, information, data, and a message received from the UE 120 are received via the eNodeB. The communication unit 210 receives a message from the UE 120. The communication unit 210 transmits a message transmitted from the UE 120 to the message delivery center 140 over the first interface. If not transmitting the message to the message delivery center 140 over the first interface, the communication unit 210 transmits to the UE 120 detach request information for reattach of the UE 120. The communication unit 210 receives location tracking information including location information of the UE 120, from the UE 120. The communication unit 210 transmits the location information of the UE 120 to the control server 130 over the second interface. The communication unit 210 transmits a paging message to the UE 120. For example, the first interface may be the SGd interface. The second interface may be the SGs interface.

The storage unit 220 stores a basic program for operations of the control node 110, application programs, and data such as setting information. For example, the storage unit 220 stores serving cell management information of UEs. The serving cell management information includes a serving cell list, radio link quality information per serving cell, and load level information per serving cell of the UEs, and may be generated as a table. The storage unit 220 provides the stored data according to a request of the control unit 230. According to an embodiment, the storage unit 220 stores subscriber information and the location information of the UE 120. For example, the storage unit 220 includes a subscriber server. For example, the subscriber server may be a HSS.

The control unit 230 controls overall operations of the control node 110. For example, the control unit 230 transmits and receives a signal through the communication unit 210. Also, the control unit 230 stores data in the storage unit 220 and reads data stored in the storage unit 220. The control unit 230 includes the service state determining unit 232. According to an embodiment, the control unit 230 determines whether a message service state over the first interface is disabled. The control unit 230 registers the location information of the UE 120 in the control server 130 over the second interface. The control unit 230 determines whether the communication of the UE 120 uses both of a first system and a second system. Herein, the first system may be a packet switched (PS) communications system, and the second system may be a circuit switched (CS) communications system. The control unit 230 operates to transmit message information transmitted from the UE 120 to the message information delivery center 140, and, if the message information transmission to the message information delivery center 140 fails over a specific number of times, determines failure of the message service state over the first interface. If transmission of information, a message, or data fails over the specific number of times, the control unit 230 may determine a failure or a fault for a corresponding interface.

For example, the control unit 230 determines whether to use the second interface. The control unit 230 determines whether the subscriber information is registered in the subscriber server. The control unit 230 determines whether the message service is enabled. The control unit 230 may include at least one processor. For example, the control unit 230 may include a communication processor (CP) for controlling the communication, and an application processor (AP) for controlling a higher layer such as application program.

For example, the control unit 230 controls the control node to perform a procedure to be described. For example, the control unit 230 may control the control node 110 to perform at least one of procedures of FIG. 4 through FIG. 14

Figure 3:
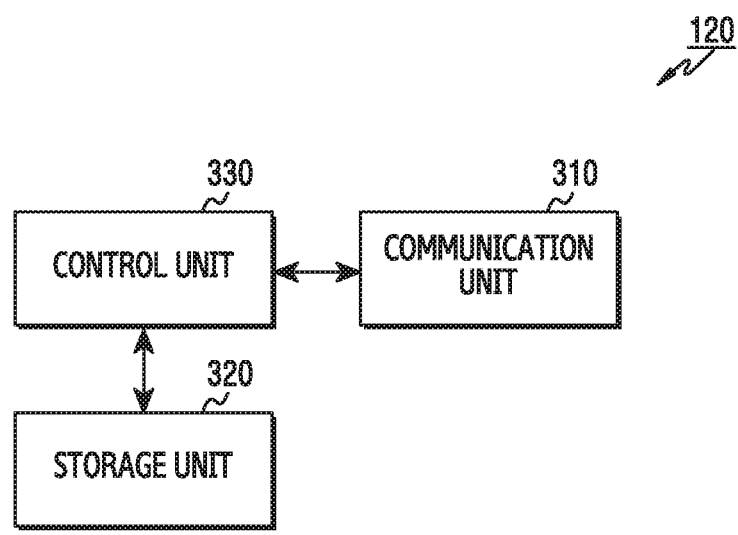
FIG. 3 illustrates a block diagram of a user equipment (UE) in a mobile communication system according to an embodiment.

FIG. 3 illustrates a block diagram of a UE in a mobile communication system according to an embodiment. FIG. 3 illustrates a configuration of the UE 120. A term such as 'portion' or '~ er' to be used indicates a unit for processing at least one function or operation, and may be implemented using hardware, software, or a combination of hardware and software.

Referring to FIG. 3, the UE 120 includes a communication unit 310, a storage unit 320, and a control unit 330.

The communication unit 310 performs functions for transmitting and receiving signals over a radio channel. For example, the communication unit 310 performs conversion functions between a baseband signal and a bit stream according to a physical layer protocol of the system. For example, in data transmission, the communication unit 310 generates complex symbols by encoding and modulating a transmit bit stream. Also, in data reception, the communication unit 310 restores a received bit stream by demodulating and decoding a baseband signal. The communication unit 310 receives a paging message from the control node 110 via the eNodeB.

According to an embodiment, the communication unit 310 is explained by excluding the eNodeB to ease explanations, but information, data, and messages received from the control node 110 are received via the eNodeB. For example, the communication unit 310 transmits a message to the control node 110. The communication unit 310 receives from the control node 110 a notification informing that functionality for forwarding a message over the first interface is disabled. Alternatively, the communication unit 310 receives from the control node 110 a notification informing that a failure has occurred in the functionality for forwarding a message over the first interface. For example, the communication unit 310 receives detach request information for reattach of the UE 120 from the control node 110. The communication unit 310 transmits location tracking information including location information of the UE 120 to the control node 110. The communication unit 310 transmits the location tracking information for the control node 110 to transmit a message over the second interface.

The storage unit 320 stores a basic program for operations of the UE 120, application programs, and data such as setting information. In particular, the storage unit 320 may store a codebook for feeding back channel information. The storage unit 320 stores the location information of the UE 120.

The control unit 330 controls overall operations of the UE. For example, the control unit 330 transmits and receives a signal through the communication unit 310. Also, the control unit 330 records and reads data in and from the storage unit 320. For doing so, the control unit 330 may include at least one processor. For example, the control unit 330 may include a CP for controlling the communication and an AP for controlling a higher layer such as application program.

For example, the control unit 330 controls the UE 120 to perform a procedure of FIG. 4, FIG. 5, FIG. 8, FIG. 9, or FIG. 13.

Figure 4:
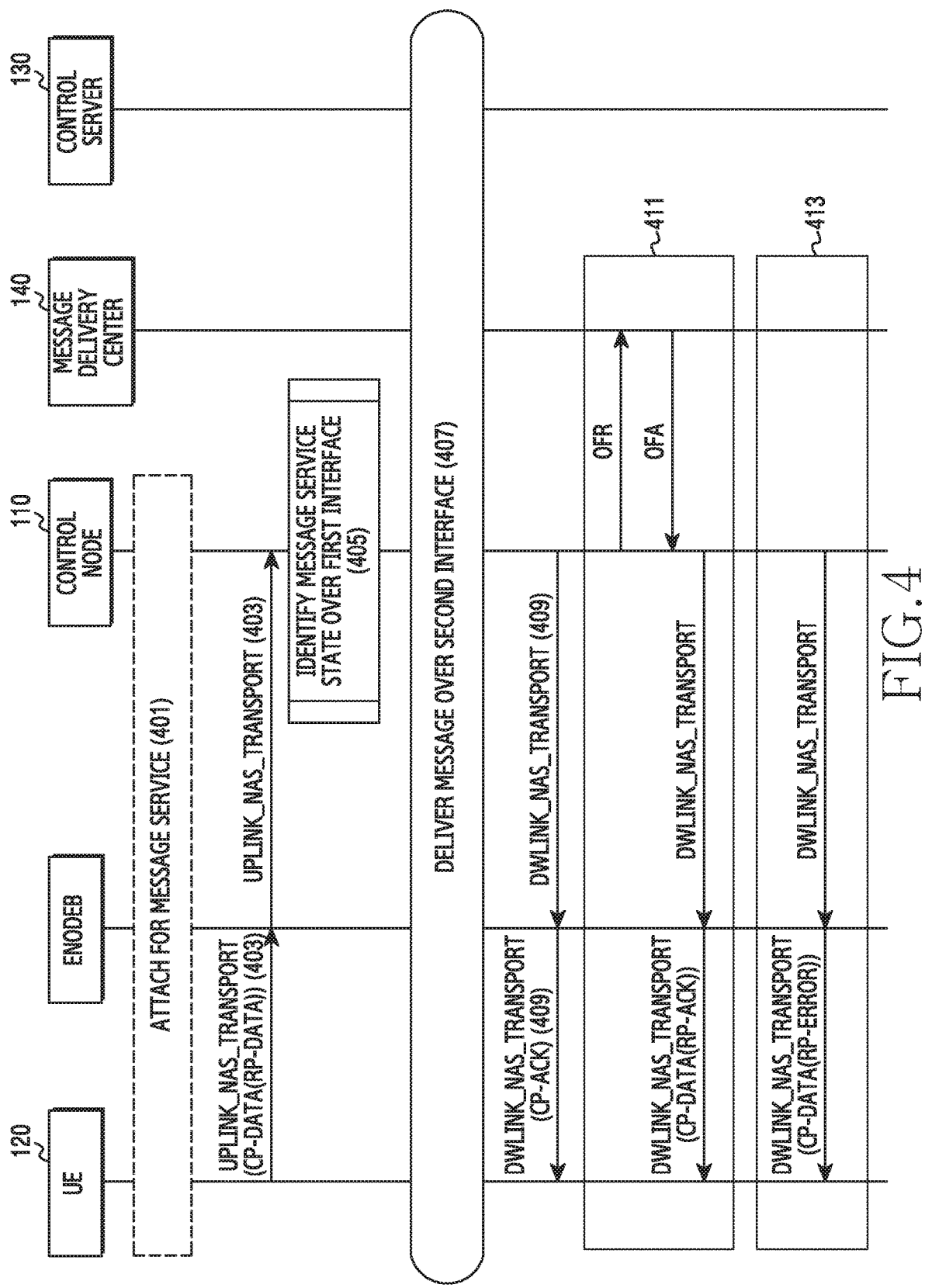
FIG. 4 illustrates a procedure for providing a message service if a UE transmits a message in a mobile communication system according to an embodiment.

FIG. 4 illustrates a procedure for providing a message service if a UE transmits a message in a mobile communication system according to an embodiment. FIG. 4 illustrates message transmission and reception of a UE 120, an eNodeB, a control node 110, a message delivery center 140, and a control server 130.

Referring to FIG. 4, in step 401, the UE 120, the eNodeB, and the control node 110 perform an attach procedure for the message service. For example, the attach procedure for the message service may be attach, TAU, or a service request procedure. To attach to the control node 110, the UE 120 transmits location tracking information including location information of the UE 120. The control node 110 receives the location tracking information from the UE 120 and registers the location information of the UE 120 in a subscriber server.

In step 403, the UE 120 forwards data to the control node 110. For example, the data may be a message, an SMS message, a short message, or a text message. The message from the UE 120 may be an UPLINK_NAS_TRANSPORT message delivered by non-access stratum (NAS) signaling. Herein, the message sent from the UE 120 may include a CP-DATA (RP-DATA) message.

In step 405, the control node 110 identifies a message service state over a first interface. Herein, the first interface is a path for the control node 110 and the message delivery center 140 to communicate directly. The control node 110 identifies whether a second interface is available, whether subscriber information is registered in the subscriber server, and whether the message service over the first interface is enabled/disabled.

If the control node 110 determines that the message service over the first interface is unavailable and the second interface is available in step 405, the control node 110 forwards the message of the UE 120 to the message delivery center 140 over the second interface. The case where the second interface is available indicates that the control node 110 registers location information of the UE 120 in the control server 130 over the second interface. That is, the control node 110 performs the communication over the second interface.

In step 409, the control node 110 transmits a response to the data received from the UE in step 403. The message transmitted by the control node 110 is a DOWNLINK_NAS_TRANSPORT message and includes CP-ACK in response to the CP-DATA.

In step 411, the control node 110 transmits a mobile originated forward short message request (OFR) message to the message delivery center 140. For example, the OFR may be referred to as a short message service mobile originated (SMS MO) request message. Next, the control node 110 receives a mobile originated forward short message Answer (OFA) message from the message delivery center 140. Herein, the OFA message is a response to the OFR message transmitted from the control node 110 to the message delivery center 140. For example, the OFA message may be referred to as an SMS MO response message. The control node 110, receiving the OFA message, may determine whether the message of the UE 120 delivered to the message delivery center 140. Step 411 is a case where the control node 110 determines the message delivered. If the message delivery is successful, the control node 110 forwards a DOWNLINK_NAS_TRANSPORT message to the UE 120. The DOWNLIN_NAS_TRANSPORT message is transmitted by including RP-ACK information in CP-DATA.

Step 413 is a case where the control node 110 determines no message delivered. If the control node 110 fails in the message delivery, the control node 110 transmits a DOWNLINK_NAS_TRANSPOR message to the UE 120. Herein, the DOWNLINK_NAS_TRANSPORT message forwarded by the control node 110 includes RP-ERROR information. The RP-ERROR information indicates that the information is not delivered successfully.

Figure 5:
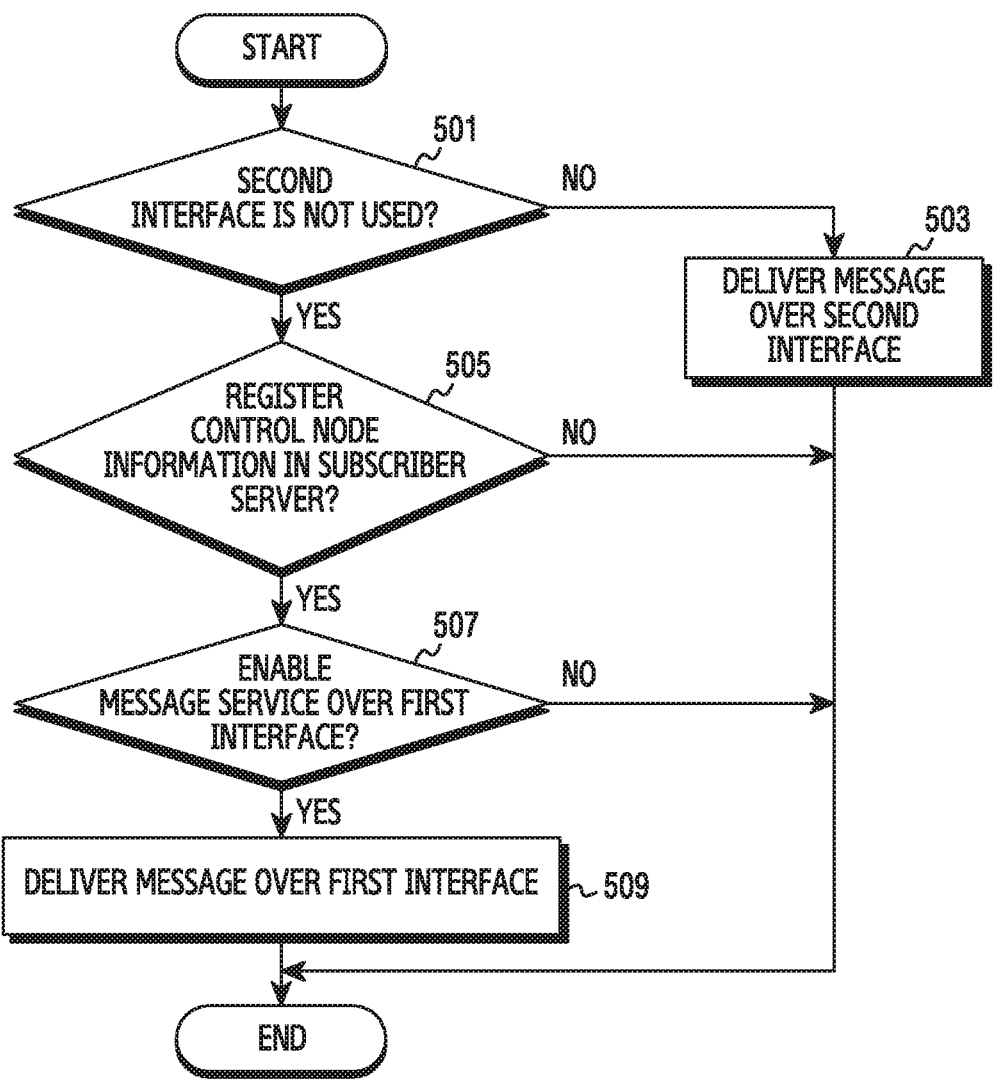
FIG. 5 illustrates a procedure for identifying a message service state over a first interface service if a UE transmits a message in a mobile communication system according to an embodiment.

FIG. 5 illustrates a procedure for identifying a message service state over a first interface service if a UE transmits a message in a mobile communication system according to an embodiment. FIG. 5 illustrates the procedure for identifying the message service state over the first interface, that is, a state of the SMS in MME functionality. FIG. 5 specifies the step for identifying the message service state over the first interface, which is step 405 of FIG. 4.

Referring to FIG. 5, in step 501, the control node 110 determines whether a second interface is not used. Herein, the second interface may be unused if location information of the UE 120 is not registered in the control server 130. By contrast, the second interface is used if the location information of the UE 120 is registered in the control server 130. For example, the second interface may be referred to as a SGs interface. The second interface is a signaling path for the control node 110 to communicate via the control server 130 of the second system in the first system. The case where the second interface is used may correspond to a case where the communication is performed over the second interface. The case where the second interface is not used may be a case where the control node 110 does not communicate over the second interface. If determining that the second interface is used, the control node 110 forwards a message of the UE over the second interface in step 503.

In step 505, the control node 110 determines whether control node information for the SMS service is registered in a subscriber server which is located at a next layer of network configuration from the control node 110. If the control node information for the SMS service is not registered in the subscriber server, the control node 110 terminates a corresponding procedure.

In step 507, the control node 110 determines whether the message service is enabled. The control node 110 determines whether the message service for transmitting and receiving messages over the first interface is enabled or disabled. Herein, functionality for transmitting and receiving messages over the first interface may be the MME in SMS functionality. Herein, if the message service is not enabled, the control node 110 terminates a corresponding procedure. For example, the first interface may be the SGd interface.

In step 509, the control node 110 forwards a message over the first interface. For example, the message may be a text message, a short message service message, or a short message.

Figure 6:
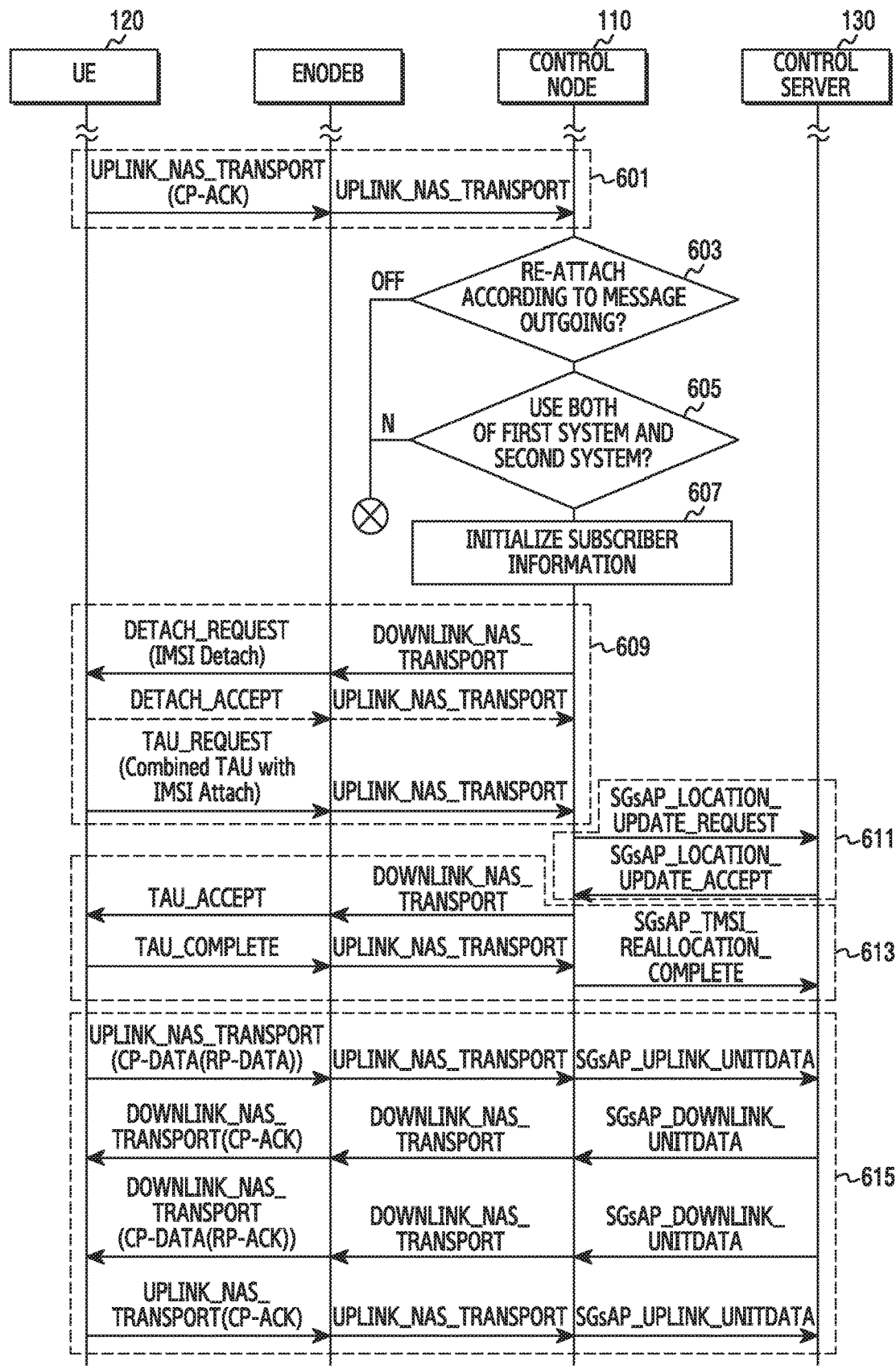
FIG. 6 illustrates a procedure for providing a message service if a UE transmits a message and the message service over a first interface is disabled in a mobile communication system according to an embodiment.

FIG. 6 illustrates a procedure for providing a message service if a UE transmits a message and the message service over a first interface is disabled in a mobile communication system according to an embodiment. FIG. 6 illustrates the procedure for, if the message service over the first interface is disabled in a network including a UE 120, an eNodeB, a control node 110, a message delivery center 140, and a control server 130, updating location information of the UE 120 and providing the message service over a second interface. FIG. 6 illustrates the procedure after, if a message transmitted from the UE 120 is not forwarded to the message delivery center 140 as shown in step 413 of FIG. 4, transmitting to the UE 120 a message notifying that a message service state is inactive.

Referring to FIG. 6, in step 601, the control node 110 receives a CP-ACK from the UE 120. Herein, the CP-ACK is delivered through an UPLINK_NAS_TRANSPORT message. The CP-ACK is a response to the message for the control node 110 to inform that the message service state over the first interface is disabled. For example, if receiving RP-DATA from the UE 120, the control node 110 transmits a CP-ACK message to the UE 120 and transmits a message including RP-ERROR. For example, the RP-ERROR may include information notifying that the message service over the first interface is disabled or that the first interface which provides the message service has a failure.

In step 603, the control node 110 determines whether to attempt re-attach according to message outgoing. The control node 110 attempts the re-attach procedure in order to address state mismatch with the UE 120. The control node 110 determines whether an even is caused by the message outgoing from the UE 120 to prevent overload of the control node 110 and the eNodeB. Herein, the re-attach procedure may be a procedure for updating location information of the UE 120.

In step 605, the control node 110 determines whether the UE 120 uses both of a first system and a second system. Herein, the first system is a PS system, and the second system is a CS system. Only if the UE 120 uses both of the first system and the second system, the control node 110 may provide the message service over the second interface.

In step 607, the control node 110 initializes subscriber information. The control node 110 initializes the subscriber information pre-stored before updating the subscriber information of the UE 120. For example, if not initializing the subscriber information, the UE 120 may perform the communication using a previous communication path, rather than communicating using the updated path.

In step 609, the control node 110 leads to the re-attach of the UE 120 by transmitting a DETACH_REQUEST (IMSI Detach) message to the UE 120. Herein, the DETACH_REQUEST (IMSI Detach) message is transmitted from the eNodeB to the UE 120 using a DOWNLINK_NAS_TRANSPORT message. For example, the DETACH_REQUEST message may be referred to as a detach request message. Next, the UE 120 transmits a DETACH_ACCEPT message to the control node 110 in response to the DETACH_REQUEST message. The DETACH_ACCEPT message is transmitted from the eNodeB to the control node 110 using an UPLINK_NAS_TRANSPORT message. Next, the UE 120 transmits a TAU_REQUEST (Combined TAU with IMSI Attach) message. The TAU_REQUEST (Combined TAU with IMSI Attach) message is transmitted from the eNodeB to the control node 110 using an UPLINK_NAS_TRANSPORT message. For example, the TAU_REQEUST message may be referred to as location tracking information. Herein, the TAU_REQEUST message needs to determine an evolved packet system (EPS) update type parameter value of the message to 'TA/LA updating with IMSI'. In addition, the SMS in MME functionality must be disabled in system settings.

In step 611, the control node 110 transmits a SGsAP_LOCATION_UPDATE_REQUEST message to the control server 130. The SGsAP_LOCATION_UPDATE_REQUEST message includes the location information of the UE. Herein, the SGsAP_LOCATION_UPDATE_REQUEST message is transmitted from the control node 110 to the control server 130 over the SGs interface. For example, the SGs interface may be referred to as the second interface. Next, the control node 110 receives a SGsAP_LOCATION_UPDATE_ACCEPT message from the control server 130. Herein, the SGsAP_LOCATION_UPDATE_ACCEPT message indicates that the location information of the UE 120 is registered in the control server 130.

In step 613, the control node 110 transmits a TAU_ACCEPT message to the control node 110. The TAU_ACCEPT message includes information indicating that the location information of the UE 120 is registered in the control server 130. Next, the UE 120 transmits a TAU_COMPLETE message to the control node 110, the control node 110 transmits a SGsAP_TMSI_REALLOCATION_COMPLETE message to the control server 130, and thus the location information update procedure of the UE 120 over the second interface is finished.

In step 615, the UE 120 transmits CP-DATA to the control node 110. The control node 110 transmits the received CP-DATA to the control server 130. The CP-DATA may be referred to as a message, a short message service message, a text message, a short message, or the like. Next, the control node 110 receives from the control server 130 and forwards CP-ACK to the UE 120, receives from the control server 130 and forwards CP-DATA to the UE 120, and receives from the UE 120 and forwards CP-ACK to the control server 130. Herein, the CP-ACK is response information to the CP-DATA. For example, an SMS outgoing message transmitted by the UE 120 is delivered to the message delivery center 140 via the control server 130. An SMS incoming message transmitted by the message delivery center 140 is delivered to the UE 120 via the control server 130.

Figure 7:
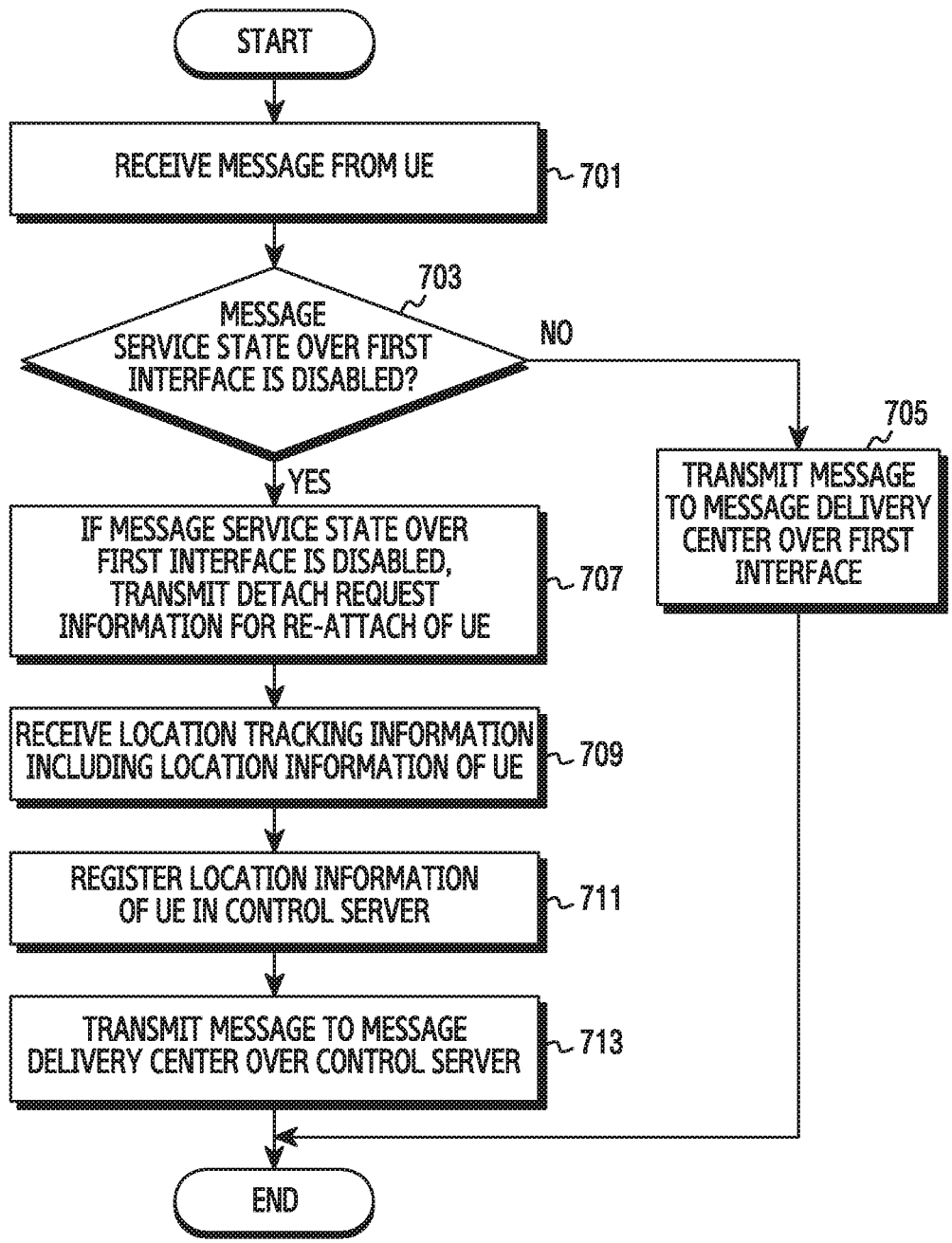
FIG. 7 illustrates an operating procedure of a control node if a UE transmits a message in a mobile communication system according to an embodiment.

FIG. 7 illustrates an operating procedure of a control node if a UE transmits a message in a mobile communication system according to an embodiment. FIG. 7 illustrates the procedure for transmitting a message of the UE over a second interface if the control node recognizes an inactive message service state.

Referring to FIG. 7, in step 701, the control node receives a message from the UE. For example, if the control node receives a message from the UE, it may be referred to as an SMS MO mode. For example, the message may be referred to as a short message, message data, a text message, an SMS message, and the like.

In step 703, the control node determines whether the message service state over a first interface is disabled. For example, the message service may be the SMS in MME functionality. The message service, which is optional, may be enabled or disabled by the operator. Herein, the message service refers to a service provided by the control node to subscribers by directly interworking with the message delivery center over the first interface in the first system. For example, the first system may be an LTE system, a 4Generation (4G) system, a PS system, and so on. The first interface may be the SGd interface.

If the message service state over the first interface is active in step 703, the control node transmits the message to the message delivery center over the first interface in step 705. For example, if the control node transmits the message to the message delivery center in the first system, the message transmitted by the control node is transmitted to the message delivery center over the first interface.

If the message service state over the first interface is inactive in step 703, the control node transmits detach request information for re-attach of the UE to the UE in step 707. Herein, the detach request information is transmitted from the control node to the UE in order to perform a re-attach procedure of the UE. The detach request information may be information requesting information for updating location information of the UE by conducting the re-attach procedure of the UE.

In step 709, the control node receives location tracking information including the location information of the UE. For example, the location tracking information may be referred to as the TAU message. The location tracking information is stored in the UE by reflecting a changed location if the location of the UE changes.

In step 711, the control node registers the location information of the UE in the control server. The control node uses the second interface to communicate with the control server which is located in the second system. The control node registers the location information of the UE received from the UE over the second interface, in the control server. The control server registers the location information of the UE from the control node and stores the location information of the UE in the location registering unit. By registering the location information of the UE over the second interface, the control node may transmit a message to the message delivery center over the second interface. Further, the control node may receive a message from the message delivery center over the second interface.

In step 713, the control node transmits a message to the message delivery center via the control server. The control node transmits the message received from the UE to the message delivery center over the second interface. That is, if not transmitting a message of the UE over the first interface, the control node may transmit a message to the message delivery center via the second interface and the control server by receiving the location tracking information from the UE and registering the location information of the UE in the control server over the second interface.

Figure 8:
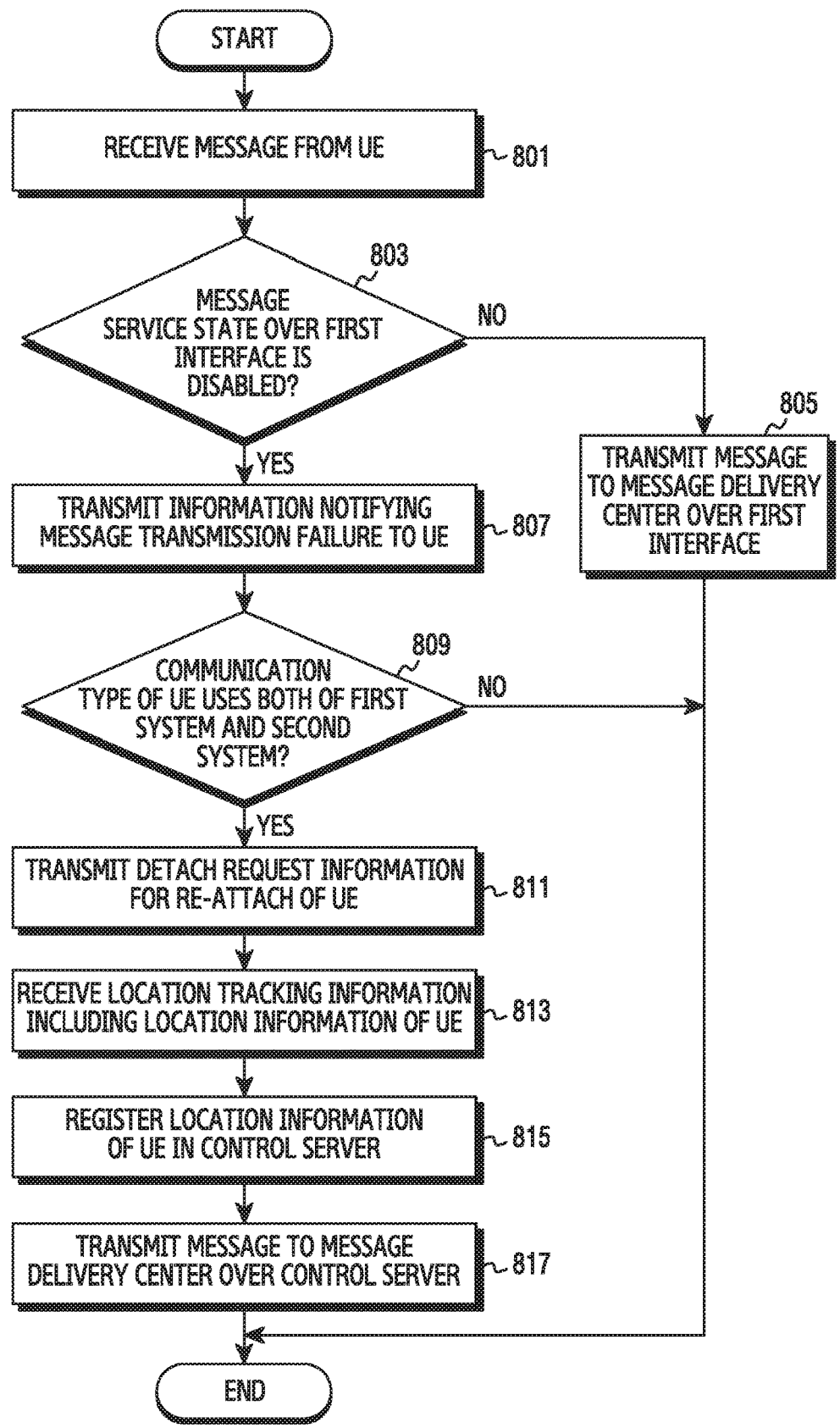
FIG. 8 illustrates an operating procedure of a control node if a UE transmits a message in a mobile communication system according to another embodiment.

FIG. 8 illustrates an operating procedure of a control node if a UE transmits a message in a mobile communication system according to another embodiment. FIG. 8 illustrates that the control node transmits a message over the second interface if a message service state is inactive.

Referring to FIG. 8, in step 801, the control node receives a message from the UE. For example, if the control node receives a message from the UE, it may be referred to as the SMS MO mode. For example, the message may be referred to as a short message, message data, a text message, an SMS message, and the like.

In step 803, the control node determines whether the message service state over a first interface is disabled. For example, the message service may be the SMS in MME functionality. The message service, which is optional, may be enabled or disabled by the operator. Herein, the message service refers to a service provided by the control node to subscribers by directly interworking with the message delivery center over the first interface in the first system. For example, the first system may be an LTE system, a 4G system, a PS system, and so on. The first interface may be the SGd interface. For example, the control node transmits the message transmitted from the UE to the message delivery center over the first interface. The control node determines whether the message transmission is successful, based on whether a response message is received from the message delivery center. If the message transmission fails, the control node determines the inactive message service state using the first interface.

If the message service state over the first interface is active in step 803, the control node transmits the message to the message delivery center over the first interface in step 805. For example, if not failing in the message transmission over the first interface, the control node determines satisfactory message transmission and reception over the first interface.

If the message service state over the first interface is inactive in step 803, the control node transmits information notifying the message transmission failure to the UE in step 807. For example, the control node transmits the information notifying the message transmission failure to the UE. The UE may receive the information notifying the message transmission failure, and recognize the message transmission unavailable over the first interface.

In step 809, the control node determines whether a communication type of the UE uses both of the first system and the second system. Herein, the first system is a PS system, and the second system is a CS system. Only if the UE 120 uses both of the first system and the second system, the control node 110 may provide the message service over the second interface. For example, the first system may be a LTE network. For example, the second system may be a WCDMA network.

In step 811, the control node transmits detach request information for re-attach of the UE to the UE. Herein, the detach request information is transmitted from the control node to the UE in order to perform a re-attach procedure of the UE. The detach request information may be information requesting information for updating the location information of the UE by conducting the re-attach procedure of the UE.

In step 813, the control node receives location tracking information including the location information of the UE. For example, the location tracking information may be referred to as the TAU message. The location tracking information is stored in the UE by reflecting a changed location if the location of the UE changes.

In step 815, the control node registers the location information of the UE in the control server. The control node uses the second interface to communicate with the control server which is located in the second system. The control node registers the location information of the UE received from the UE over the second interface, in the control server. The control server registers the location information of the UE from the control node and stores the location information of the UE in the location registering unit. By registering the location information of the UE over the second interface, the control node may transmit a message to the message delivery center over the second interface. Further, the control node may receive a message from the message delivery center over the second interface. For example, the control node may change the path for transmitting the message of the UE from the first interface to the second interface, by receiving the location information from the UE and registering the location information of the UE in the control server.

In step 817, the control node transmits a message to the message delivery center via the control server. The control node transmits a message received from the UE to the message delivery center over the second interface. That is, if not transmitting a message of the UE over the first interface, the control node may transmit the message to the message delivery center via the second interface and the control server by receiving the location tracking information from the UE and registering the location information of the UE in the control server over the second interface.

Figure 9:
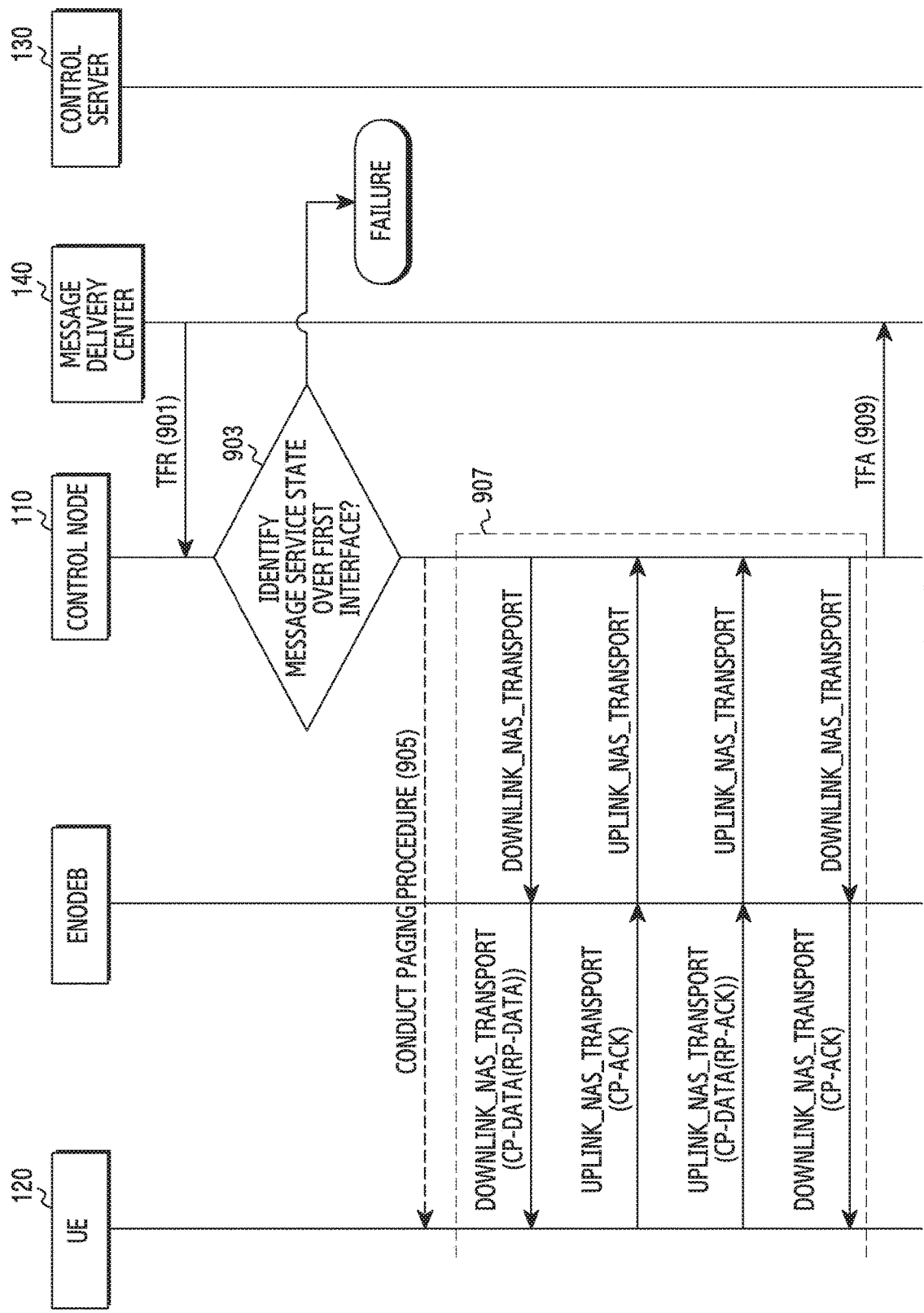
FIG. 9 illustrates a procedure for providing a message service if a UE receives a message in a mobile communication system according to an embodiment.

FIG. 9 illustrates a procedure for providing a message service, if a UE receives a message in a mobile communication system according to an embodiment. FIG. 9 illustrates a case where a message is forwarded from a message delivery center to the UE.

Referring to FIG. 9, the message delivery center 140 transmits a mobile terminated forward request (TFR) message to the control node 110 in step 901. For example, the TFR message may be referred to as a short message service mobile terminated (SMS MT) request message. The control node 110, receiving the TFR message, detects that a message is to be received from the message delivery center 140.

In step 903, the control node 110 identifies a message service state over a first interface. Herein, the first interface is a path for the control node 110 and the message delivery center 140 to perform communication directly. The control node 110 identifies whether a second interface is used, whether subscriber information is registered in a subscriber server, and the message service over the first interface is enabled/disabled. Herein, if determining that the message service state over the first interface is inactive, the control node determines that the message service over the first interface is unavailable, and determines a failure.

In step 905, the control node 110 transmits a paging message to the UE 120 via an eNodeB. The paging message is broadcast information transmitted to an idle UE and is transmitted from the control node 110 to the UE 120 over via eNodeB. For example, the paging message, including small data, may be transmitted to the UE 120. For example, the control node 110 may change the UE 120 from the idle state to an operative state by performing a paging procedure.

In step 907, the control node 110 transmits CP-DATA to the UE 120. Herein, the CP-DATA may be a message transmitted from the message delivery center 140. Information transmitted from the control node 110 to the UE 120 is delivered between the control node 110 and the eNodeB through a DOWNLINK_NAS_TRANSPORT message. By contrast, information delivered from the UE 120 to the control node 110 is delivered between the control node 110 and the eNodeB through an UPLINK_NAS_TRANSPORT message. The UE 120 receives the CP-DATA from the control node 110 and transmits CP-ACK in response to the CP-DATA to the control node 110. Next, the UE 120 transmits CP-DATA including RP-ACK to the control node 110. The control node 110 transmits CP-ACK to the UE 120 in response to the CP-DATA including the RP-ACK. Herein, the RP-ACK may include information indicating the UE 120 receives the message. That is, the control node 110 may transmit the CP-DATA including the RP-DATA indicating the message, to the UE 120, receive the CP-DATA including the RP-ACK from the UE, and recognize that the UE 120 receives the message.

In step 909, the control node 110 transmits a mobile terminated forward answer (TFA) message to the message delivery center 140. Herein, the TFA message includes a response to the TFR message. For example, the control node 110 may transmit the TFA message including information which includes a message transmission result to the UE 120.

Figure 10:
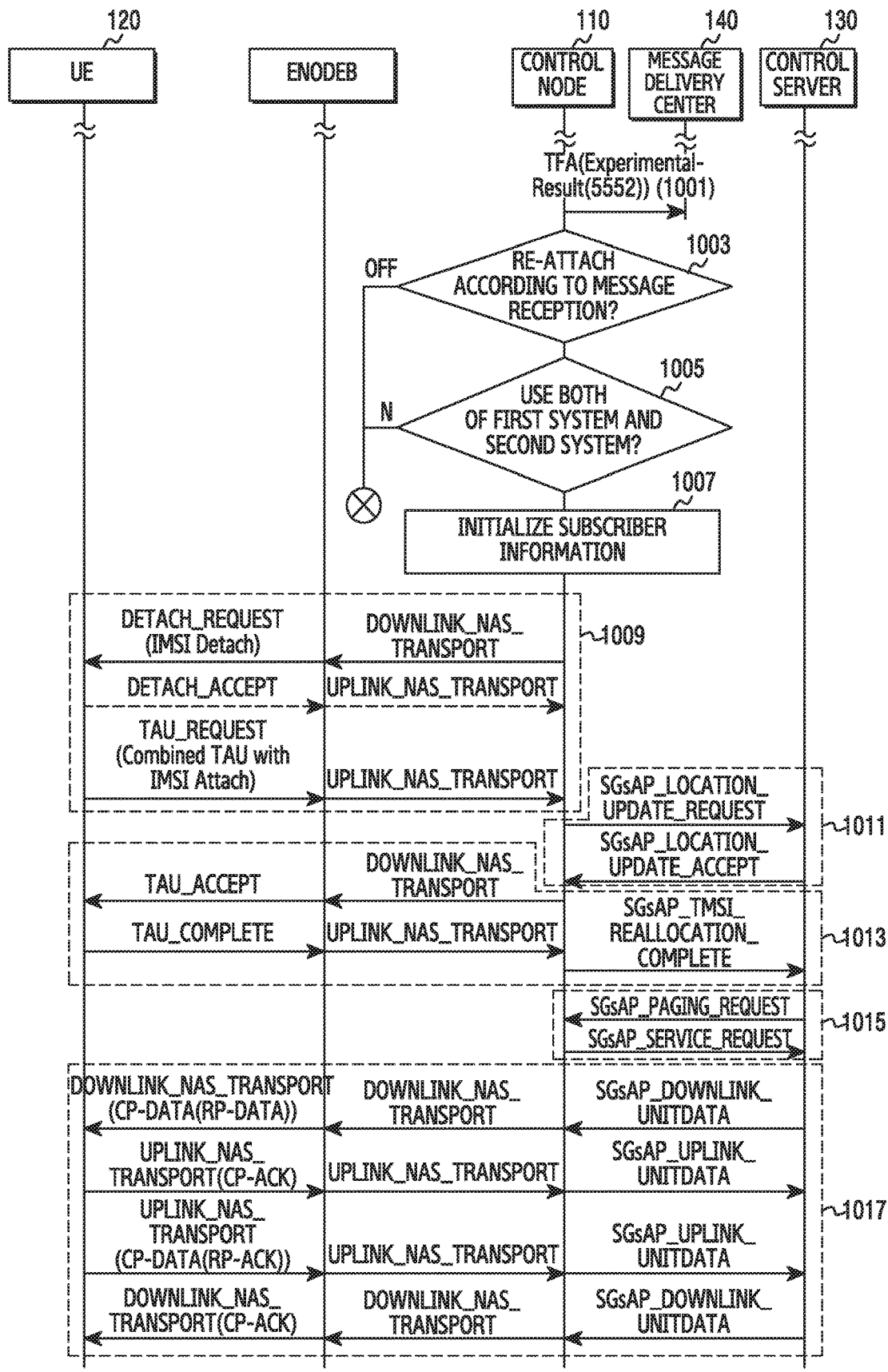
FIG. 10 illustrates a procedure for providing a message service if a UE receives a message and the message service over a first interface is disabled in a mobile communication system according to an embodiment.

FIG. 10 illustrates a procedure for providing a message service if a UE receives a message and the message service over a first interface is disabled in a mobile communication system according to an embodiment. FIG. 10 illustrates the procedure for a control node 110 to receive a message by changing a message reception path from a first interface to a second interface, if the control node 110 receives the message from a message delivery center 140 but the control node 110 is configured not to process the message received from the message delivery center 140 over the first interface.

Referring to FIG. 10, in step 1001, the control node 110 transmits a TFA message to the message delivery center 140. Herein, the TFA message includes a response to a TFR message. For example, the control node 110 may transmit the TFA message including information which includes a message transmission result of the UE 120.

In step 1003, the control node 110 determines whether to conduct re-attach according to message reception. Herein, if re-attach setting according to the message reception is not enabled (ON state), the control node 110 performs only step 1001. The control node 110 attempts the re-attach procedure in order to solve state mismatch with the UE 120. The control node 110 determines whether an event is occurred by the message reception from the UE 120 in order to prevent overload of the control node 110 and an eNodeB. Herein, the re-attach procedure may be a procedure for updating location information of the UE 120.

In step 1005, the control node 110 determines whether the UE 120 uses both of a first system and a second system. Herein, the first system is a PS system, and the second system is a CS system. Only if the UE 120 uses both of the first system and the second system, the control node 110 may provide the message service over the second interface.

In step 1007, it initializes subscriber information. The control node 110 initializes subscriber information previously stored before updating subscriber information of the UE 120. For example, if the subscriber information is not initialized, the UE 120 does not perform communication over the updated path but may perform the communication over a previous communication path.

In step 1009, the control node 110 transmits a DETACH_REQUEST (IMSI Detach) message to the UE 120, and thus leads the re-attach of the UE 120. Herein, the DETACH_REQUEST (IMSI Detach) message is transmitted from the eNodeB to the UE 120 using a DOWNLINK_NAS_TRANSPORT message. For example, the DETACH_REQUEST message may be referred to as a detach request message. Next, the UE 120 transmits a DETACH_ACCEPT message to the control node 110 in response to the DETACH_REQUEST message. The DETACH_ACCEPT message is transmitted from the eNodeB to the control node 110 using an UPLINK_NAS_TRANSPORT message. Next, the UE 120 transmits a TAU_REQUEST (Combined TAU with IMSI Attach) message. The TAU_REQUEST (Combined TAU with IMSI Attach) message is transmitted from the eNodeB to the control node 110 through an UPLINK_NAS_TRANSPORT message. For example, the TAU_REQEUST message may be referred to as location tracking information. The TAU_REQEUST message should determine an EPS update type parameter value of the message, as 'TA/LA updating with IMSI'. In addition, the SMS in MME functionality in system settings must be disabled.

In step 1011, the control node 110 transmits a SGsAP_LOCATION_UPDATE_REQUEST message to the control server 130. The SGsAP_LOCATION_UPDATE_REQUEST message includes the location information of the UE. Herein, the SGsAP_LOCATION_UPDATE_REQUEST message is transmitted from the control node 110 to the control server 130 over the SGs interface. For example, the SGs interface may be referred to as a second interface. Next, the control node 110 receives a SGsAP_LOCATION_UPDATE_ACCEPT message from the control server 130. Herein, the SGsAP_LOCATION_UPDATE_ACCEPT message indicates that the location information of the UE 120 is registered in the control server 130.

In step 1013, the control node 110 transmits a TAU_ACCEPT message to the UE 120. The TAU_ACCEPT message includes information indicating that the location information of the UE 120 is registered in the control server 130. Next, the UE 120 transmits a TAU_COMPLETE message to the control node 110 and the control node 110 transmits a SGsAP_TMSI_REALLOCATION_COMPLETE message to the control server 130, thus completing the location information updating procedure of the UE over the second interface.

In step 1015, the control node 110 receives a SGsAP_PAGING REQUEST message from the control server 130. The SGsAP_PAGING_REQUEST message is a message for identifying whether the SGs interface is configured in association with the UE 120, and is transmitted from the control server 130 to the control node 110. Next, the control node 110 transmits a SGsAP_SERVICE_REQUEST message to the control server 130. The SGsAP_SERVICE_REQUEST message includes response information about whether the SGs interface is configured in association with the UE 120. For example, the SGsAP_SERVICE_REQUEST message may include information indicating that the SGs interface is set.

In step 1017, the control node 110 receives CP-DATA (RP-DATA) from the control server 130 and forwards to the UE 120. Herein, the RP-DATA is a message received from the message delivery center 140. For example, the message may be referred to as a short message service message, a text message, a short message, or the like. Next, the control node 110 receives CP-ACK from the UE 120. Herein, the CP-ACK is a response to the message received from the UE 120. The control node 110 forwards the CP-ACK received from the UE 120 to the control server 130. For example, an SMS incoming message received from the message delivery center 140 is received at the control node 110 via the control server 130, and the control node 110 forwards the received SMS incoming message to the UE 120. An SMS incoming message transmitted by the message delivery center 140 is forwarded is to the UE 120 via the control server 130. The control node 110 and the control server 130 are connected over the second interface. The control node 110 receives a message and a response to the data transmitted from the UE using a SGsAP_DOWNLINK_UNITDATA message to the control server 130. The control node 110 forwards the message to the UE 120 through a DOWNLINK_NAS_TRANSPORT message. The control node 110 receives CP-ACK and CP-DATA (RP-ACK) from the UE 120 through an UPLINK_NAS_TRANSPORT message. The control node 110 transmits the CP-ACK and the CP-DATA (RP-ACK) from the UE 120 to the control server 130 using a SGsAP_UPLINK_UNITDATA message.

Figure 11:
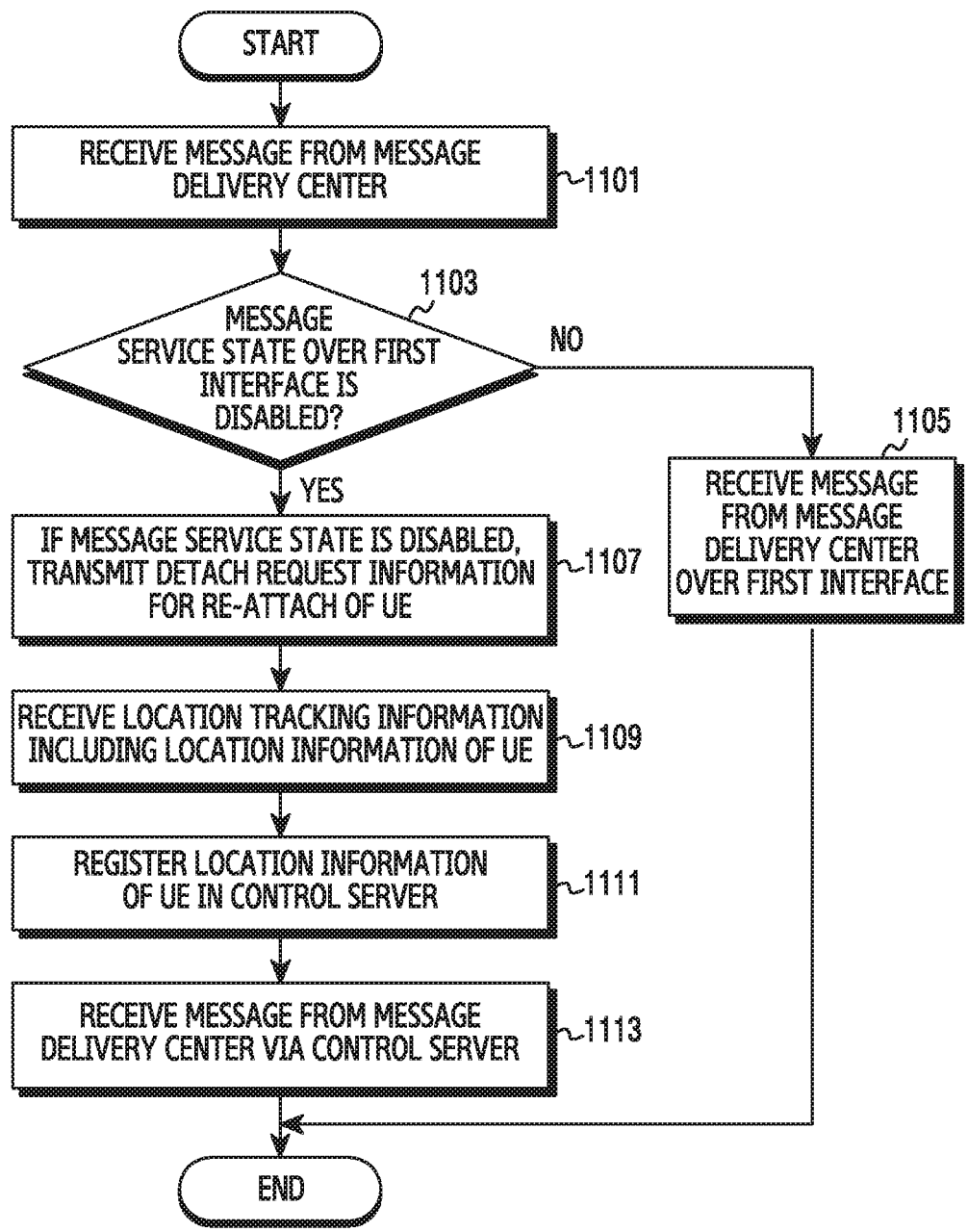
FIG. 11 illustrates an operating procedure of a control node if a UE receives a message in a mobile communication system according to an embodiment.

FIG. 11 illustrates an operating procedure of a control node if a UE receives a message in a mobile communication system according to an embodiment. FIG. 11 illustrates the procedure for receiving a message by changing from a first interface to a second interface, if the control node receives the message from a message delivery center and a message service state over the first interface is inactive.

Referring to FIG. 11, in step 1101, the control node receives a message from the message delivery center. The case where the control node receives the message from the message delivery center indicates that other UE transmits the message to the message delivery center and the message is forwarded from the message delivery center to the UE. For example, the control node may, when if an SMS MT request message is received from the message delivery center, recognize that the message is forwarded from the message delivery center.

In step 1103, the control node determines whether the message service state over the first interface is disabled. For example, the message service may be the SMS in MME functionality. The message service may be enabled or disabled by an operator, which is optional. Herein, the message service refers to a service provided from the control node to subscribers by directly interworking with the message delivery center over the first interface in the first system. For example, the first system may be an LTE system, a 4G networks, a PS system, and so on. The first interface may be the SGd interface.

If determining that the message service state over the first interface is active in operation 1103, the control node receives a message from the message delivery center over the first interface in step 1105. For example, if the control node receives a message from the message delivery center in the first system, information received at the control node is received from the message delivery center over the first interface.

If determining that the message service state over the first interface is inactive in operation 1103, the control node transmits detach request information for re-attach of the UE to the UE in operation 1107. Herein, the detach request information is transmitted from the control node to the UE in order to perform a re-attach procedure of the UE. The detach request information may be information requesting information for updating location information of the UE by performing the re-attach procedure of the UE.

In step 1109, the control node receives location tracking information including the location information of the UE. For example, the location tracking information may be referred to as a TAU message. The location tracking information is stored in the UE by reflecting, if the location of the UE changes, the changed location. For example, the TAU message should determine an EPS update type parameter value of the message as 'TA/LA updating with IMSI'. In addition, the SMS in MME functionality in system settings must be disabled.

In step 1111, the control node registers the location information of the UE in the control server. The control node uses a second interface to communicate with the control server which is located in the second system. The control node registers the location information of the UE received from the UE over the second interface, in the control server. The control server registers the location information of the UE from the control node and stores the location information of the UE in the location registering unit. Since the control node registers the location information of the UE over the second interface, the control node may transmit a message to the message delivery center over the second interface. Further, the control node may receive a message from the message delivery center over the second interface.

In step 1113, the control node receives a message from the message delivery center via the control server. The control node transmits the message received from the message delivery center to the UE over the second interface. That is, if not receiving a message from the message delivery center over the first interface, the control node transmits detach request information for the re-attach of the UE to the UE. Next, the control node may receive the location tracking information from the UE, register the location information of the UE in the control server over the second interface, and thus receive a message from the message delivery center via the second interface and the control server. The control node forwards the message received from the message delivery center to the UE.

Figure 12:
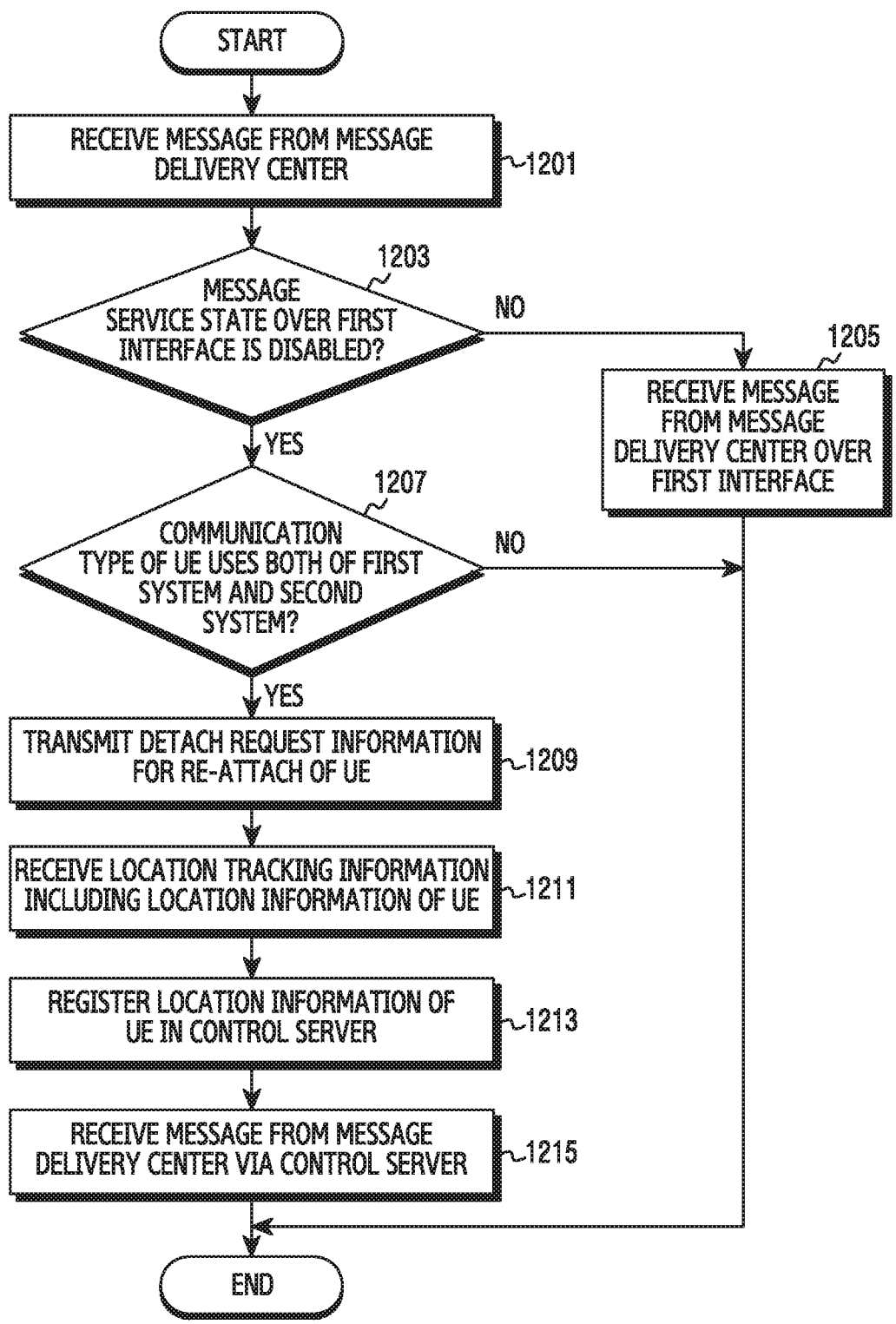
FIG. 12 illustrates an operating procedure of a control node if a UE receives a message in a mobile communication system according to another embodiment.

FIG. 12 illustrates an operating procedure of a control node if a UE receives a message in a mobile communication system according to another embodiment. FIG. 12 illustrates the procedure for receiving the message by switching from a first interface to a second interface if the control node receives the message from a message delivery center and a message service state over the first interface is inactive.

Referring to FIG. 12, in step 1201, the control node receives a message from the message delivery center. The case where the control node receives the message from the message delivery center indicates that other UE transmits the message to the message delivery center and the message is forwarded from the message delivery center to the UE. For example, the control node may, when if an SMS MT request message is received from the message delivery center, recognize that the message is forwarded from the message delivery center.

In step 1203, the control node determines whether the message service state over the first interface is inactive. For example, the message service may be the SMS in MME functionality. The message service may be enabled or disabled by an operator, which is optional. Herein, the message service refers to a service provided from the control node to subscribers by directly interworking with the message delivery center over the first interface in the first system. For example, the first system may be an LTE system, a 4G networks, a PS system, and so on. The first interface may be the SGd interface.

If determining that the message service state over the first interface is active in operation 1203, the control node receives a message from the message delivery center over the first interface in step 1205. For example, if the control node receives a message from the message delivery center in the first system, information received at the control node is received from the message delivery center over the first interface.

If determining that the message service state over the first interface is inactive in operation 1203, the control node determines whether a communication type of the UE uses both of the first system and the second system. Herein, the first system is a PS system, and the second system is a CS system. Only if the UE 120 uses both of the first system and the second system, the control node 110 may provide the message service over the second interface. For example, the first system may be an LTE network. For example, the second system may be a WCDMA network. If determining that the communication type of the UE does not use both of the first system and the second system, the control node determines no message service by switching from the first interface to the second interface and thus terminates the procedure.

In step 1209, the control node transmits detach request information for re-attach of the UE to the UE. Herein, the detach request information is transmitted from the control node to the UE in order to perform a re-attach procedure of the UE. The detach request information may be information requesting information for updating the location information of the UE by conducting the re-attach procedure of the UE.

In step 1211, the control node receives location tracking information including the location information of the UE. For example, the location tracking information may be referred to as a TAU message. The location tracking information is stored in the UE by reflecting, if the location of the UE changes, the changed location.

In step 1213, the control node registers the location information of the UE in the control server. The control node uses the second interface to communicate with the control server which is located in the second system. The control node registers the location information of the UE received from the UE over the second interface, in the control server. The control server registers the location information of the UE from the control node and stores the location information of the UE in the location registering unit. The control node registers the location information of the UE over the second interface, and thus the control node may transmit a message to the message delivery center over the second interface. Further, the control node may receive a message from the message delivery center over the second interface.

In step 1215, the control node receives a message from the message delivery center via the control server. The control node transmits the message received from the message delivery center to the UE over the second interface. That is, if not receiving a message from the message delivery center over a first interface, the control node transmits detach request information for the re-attach of the UE to the UE. Next, the control node may receive the location tracking information from the UE, register the location information of the UE in the control server over the second interface, and thus receive a message from the message delivery center via the second interface and the control server. The control node forwards the message received from the message delivery center to the UE.

Figure 13:
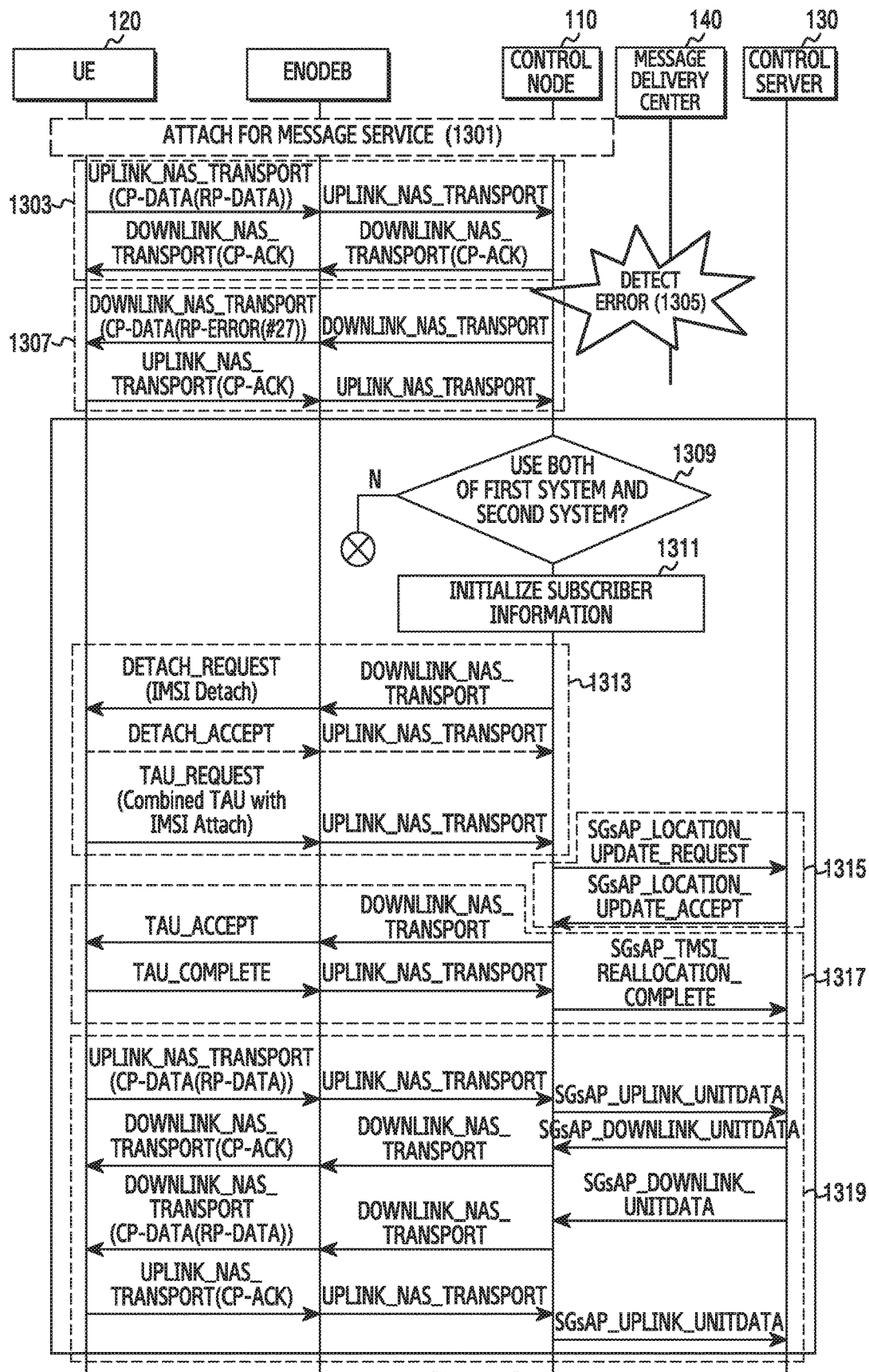
FIG. 13 illustrates a procedure for providing a message service if a failure of a first interface is detected in a mobile communication system according to an embodiment.

FIG. 13 illustrates a procedure for providing a message service if a failure of a first interface is detected in a mobile communication system according to an embodiment. FIG. 13 illustrates the procedure of the control node for, if a failure occurs at the first interface or a control node determines failure occurrence in a network including a UE 120, an eNodeB, the control node 110, a message delivery center 140, and a control server 130, updating location information of the UE 120 over a second interface and providing the message service over the second interface.

Referring to FIG. 13, in step 1301, the UE 120, the eNodeB, and the control node 110 perform an attach procedure for the message service. For example, the attach procedure for the message service may be attach, tracking area update, or a service request procedure. To attach to the control node 110, the UE 120 transmits location tracking information including location information of the UE 120. The control node 110 receives the location tracking information from the UE 120 and registers the location information of the UE 120 in a subscriber server.

In step 1303, the UE 120 transmits CP-DATA (RP-DATA) to the control node 110 using a UPLINK_NAS_TRANSPORT message. For example, the RP-DATA may be a message. For example, the message may be an SMS message, a short message, a text message, text data, and so on. Next, the control node 110 forwards CP-ACK to the UE 120 using a DOWNLINK_NAS_TRANSPORT message.

In step 1305, the control node 110 detects a failure in the first interface connected to the message delivery center 140. For example, the control node 110 determines a particular interface and transmits a message over the corresponding interface. If the number of transmission failures for the message transmitted over the particular interface is greater than a threshold, the control node 110 determines the failure in the message transmission over the particular interface. For example, the control node 110 may detect an error over the first interface through failure rate monitoring functionality.

If determining the failure in the message service over the first interface in step 1307, the control node 110 transmits CP-DATA including RP-ERROR to the UE 120 using a DOWNLINK_NAS_TRANSPORT message. For example, by receiving the CP-DATA including the RP-ERROR, the UE 120 may recognize the failure in the message service over the first interface. Next, the UE 120 transmits CP-ACK to the control node 110 in response to the CP-DATA received from the control node 110 using a UPLINK_NAS_TRANSPORT message.

In step 1309, the control node 110 determines whether the UE 120 uses both of a first system and a second system. Herein, the first system is a PS system, and the second system is a CS system. The control node 110 may provide the message service over the second interface only if the UE 120 uses both of the first system and the second system. If the UE 120 does not use both of the first system and the second system, it terminates the corresponding procedure. By contrast, if the UE 120 uses both of the first system and the second system, it proceeds to step 1311.

In step 1311, the control node 110 initializes subscriber information. The procedure for initializing the subscriber information may be referred to as a control node registration setting initialization procedure. Herein, the control node registration setting initialization procedure is a procedure for the control node 110 to initialize a registration state of the control node 110 before performing the re-attach procedure of the UE. In other words, the procedure is a procedure for the control node 110 to initialize a parameter indicating whether the subscriber information is registered in the subscriber server to provide the message service.

In step 1313, the control node 110 leads the re-attach of the UE 120 by transmitting a DETACH_REQUEST (IMSI Detach) message to the UE 120. Herein, the DETACH_REQUEST (IMSI Detach) message is transmitted from the eNodeB to the UE 120 using a DOWNLINK_NAS_TRANSPORT message. For example, the DETACH_REQUEST message may be referred to as a detach request message. Next, the UE 120 transmits a DETACH_ACCEPT message to the control node 110 in response to the DETACH_REQUEST message. The DETACH_ACCEPT message is transmitted from the eNodeB to the control node 110 using a UPLINK_NAS_TRANSPORT message. Next, the UE 120 transmits a TAU_REQUEST (Combined TAU with IMSI Attach) message. The TAU_REQUEST (Combined TAU with IMSI Attach) message is transmitted from the eNodeB to the control node 110 using a UPLINK_NAS_TRANSPORT message. For example, the TAU_REQUEST message may be referred to as location tracking information. Herein, the TAU_REQUEST message should determine an EPS update type parameter value of the message, as 'TA/LA updating with IMSI'. In addition, the SMS in MME functionality in system settings must be disabled.

In step 1315, the control node 110 transmits a SGsAP_LOCATION_UPDATE_REQUEST message to the control server 130. The SGsAP_LOCATION_UPDATE_REQUEST message includes the location information of the UE. Herein, the SGsAP_LOCATION_UPDATE_REQUEST message is transmitted from the control node 110 to the control server 130 over the SGs interface. For example, the SGs interface may be referred to as the second interface. Next, the control node 110 receives a SGsAP_LOCATION_UPDATE_ACCEPT message from the control server 130. Herein, the SGsAP_LOCATION_UPDATE_ACCEPT message indicates that the location information of the UE 120 is registered in the control server 130.

In step 1317, the control node 110 transmits a TAU_ACCEPT message to the UE 120. The TAU_ACCEPT message includes information indicating that the location information of the UE 120 is registered in the control server 130. Next, the UE 120 transmits a TAU_COMPLETE message to the control node 110, and the control node 110 transmits a SGsAP_TMSI_REALLOCATION_COMPLETE message to the control server 130, thus finishing the location information update procedure of the UE 120 over the second interface.

In step 1319, the UE 120 transmits CP-DATA to the control node 110. The control node 110 transmits the received CP-DATA to the control server 130. The CP-DATA may be referred to as a message, a short message service message, a text message, a short message, or the like. Next, the control node 110 receives from the control server 130 and forwards CP-ACK to the UE 120, receives from the control server 130 and forwards CP-DATA to the UE 120, and receives from the UE 120 and forwards CP-ACK to the control server 130. Herein, the CP-ACK is response information to the CP-DATA. For example, an SMS outgoing message transmitted by the UE 120 is delivered to the message delivery center 140 via the control server 130. An SMS incoming message transmitted by the message delivery center 140 is delivered to the UE 120 via the control server 130.

Figure 14:
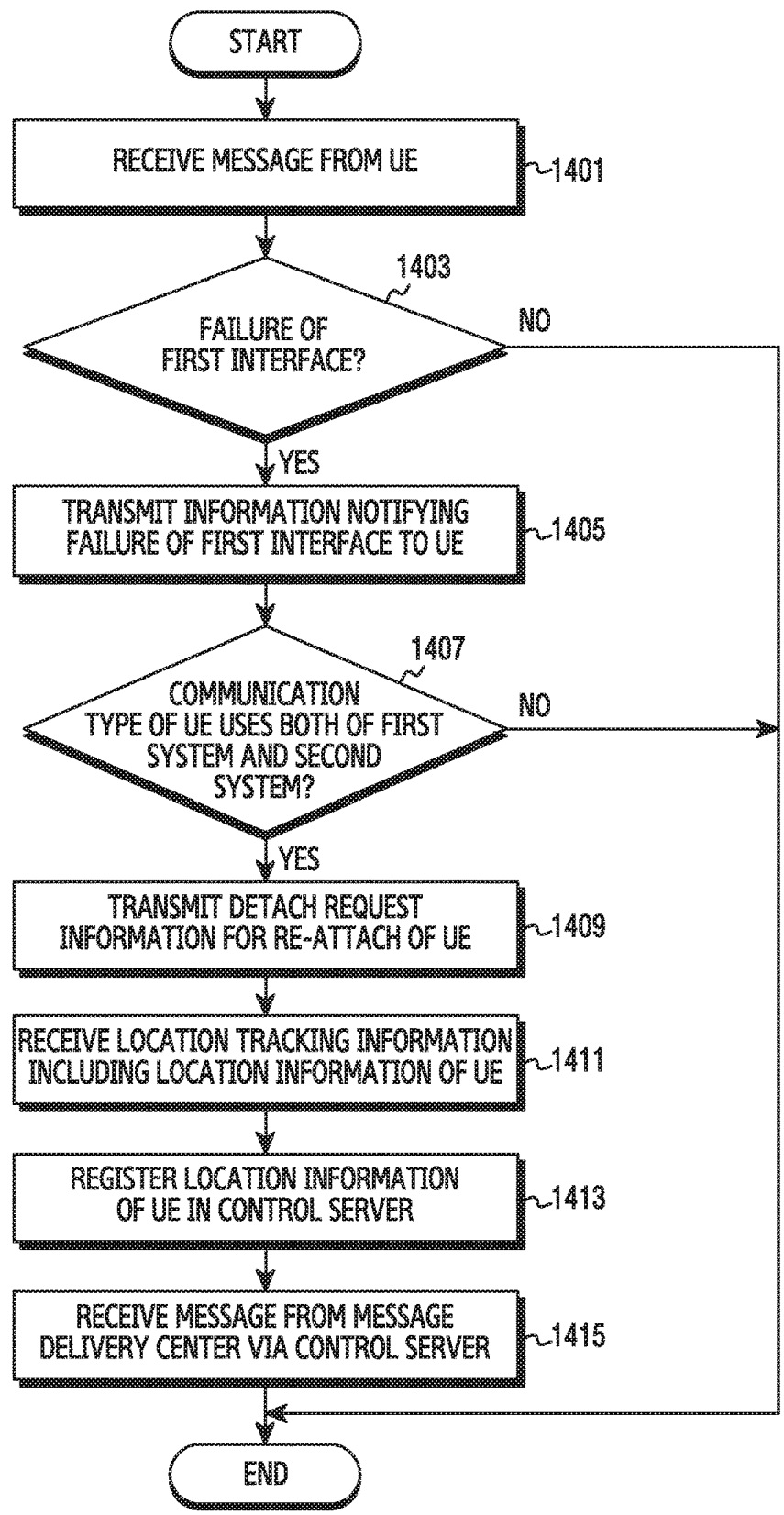
FIG. 14 illustrates an operating procedure of a control node if a failure of a first interface is detected in a mobile communication system according to an embodiment.

FIG. 14 illustrates an operating procedure of a control node if a failure of a first interface is detected in a mobile communication system according to an embodiment. FIG. 14 illustrates the procedure for, if the control node receives a message from a UE and transmits the message to a message delivery center over the first interface, determining whether a message service over the first interface has a failure, switching from the first interface to a second interface, and transmitting the message to the message delivery center.

Referring to FIG. 14, in step 1401, the control node receives a message from the UE. For example, if the control node receives a message from the UE, it may be referred to as the SMS MO mode. For example, the message may be referred to as a short message, message data, a text message, an SMS message, and the like.

In step 1403, the control node determines whether a failure of the first interface occurs. If the message service over the first interface is enabled, the control node transmits the message from the UE to the message delivery center over the first interface. The control node detects a message transmission failure. If the number of the message transmission failures exceeds a threshold, the control node determines the failure in the first interface. The control node transmits detach request information for re-attach to the UE. For example, the control node may detect an error over the first interface through the failure rate monitoring functionality. If determining no failure in the message service over the first interface, the control node finishes the corresponding procedure and transmits the message to the message delivery center over the first interface.

In step 1405, the control node transmits information notifying the message service failure to the UE. More specifically, the control node notifies the UE that the failure occurs in the message service over the first interface. For example, by notifying the UE of the failure in the message service over the first interface, the control node may instruct the UE to prepare information for performing the re-attach procedure.

In step 1407, the control node determines whether a communication type of the UE uses both of a first system and a second system. If the communication type of the UE does not use both of the first system and the second system, the control node terminates a corresponding procedure. If the communication type of the UE does not use both of the first system and the second system, the control node may not provide the UE with the message service over the second interface. For example, the first system is a PS system, and the second system is a CS system. Only if the UE 120 uses both of the first system and the second system, the control node 110 may provide the message service over the second interface. For example, the first system may be an LTE network. For example, the second system may be a WCDMA network. For example, the control node may determine whether both of the first system and the second system are used, through network access mode information of the UE contained in subscriber information. If the network access mode information is set to use both of the first system and the second system in the subscriber information, the control node 110 may set a bit (MME Registered for MT SMS) regarding control node registration for the message reception, as false in update location answer (ULA)-flag of the subscriber information.

In step 1409, the control node transmits detach request information for re-attach of the UE to the UE. The detach request information is transmitted from the control node to the UE in order to perform the re-attach procedure of the UE. The detach request information may be information requesting information for updating the location information of the UE by conducting the re-attach procedure of the UE.

In step 1411, the control node receives location tracking information including the location information of the UE. For example, the location tracking information may be referred to as a TAU message. The location tracking information is stored in the UE by reflecting, if the location of the UE changes, the changed location. If (i) the network access mode is set to use both of the first system and the second system in the subscriber information, (ii) the bit regarding the control node registration for the message reception is set as false in the ULA-flag, and (iii) a uniform resource locator (URL) message is received from the subscriber server, the control node may not set a parameter regarding the message service over the first interface in the URL message.

In step 1413, the control node registers the location information of the UE in the control server. The control node uses the second interface to communicate with the control server which is located in the second system. The control node registers the location information of the UE received from the UE over the second interface, in the control server. The control server registers the location information of the UE from the control node and stores the location information of the UE in the location registering unit. By registering the location information of the UE over the second interface, the control node may transmit a message to the message delivery center over the second interface. Also, the control node may receive a message from the message delivery center over the second interface. For example, the control node may receive the location information of the UE, register the location information of the UE in the control server, and thus change the path for transmitting the message of the UE from the first interface to the second interface.

In step 1415, the control node transmits the message to the message delivery center via the control server. The control node transmits the message received from the UE to the message delivery center over the second interface. That is, if not transmitting a message of the UE over the first interface, the control node may be connected to the control server over the second interface and transmit a message to the message delivery center over the second interface by receiving the location tracking information from the UE and registering the location information of the UE in the control server over the second interface.

The methods according to the embodiments described in the claims or the specification of the present disclosure may be implemented in software, hardware, or a combination of hardware and software.

Such software may be stored in a computer-readable storage medium. The computer-readable storage medium stores at least one program (software module), when executed by at least one processor in an electronic device, including instructions making the electronic device to execute the method the present disclosure.

Such software may be stored in volatile or non-volatile storage devices such as a read only memory (ROM), memories such as a random access memory (RAM), a memory chip, a device, or an integrated circuit, or optical or magnetic readable media such as a compact disc (CD)-ROM, a digital versatile disc (DVD), a magnetic disk, or a magnetic tape.

A storage device and a storage medium are an example of machine-readable storage media which are suitable for storing a program including instructions to implement the embodiments, or programs. The present disclosure provides a program including codes to implement an apparatus or a method according to any one of the claims of the present disclosure, and a machine-readable storage medium including the program. Further, such programs may be transferred electronically through a medium such as a communication signal transferred through a wired or wireless connection, and may appropriately include an equivalent medium.

In the specific embodiments as stated above, the elements included in the invention are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element and the elements expressed in the singular form may be configured as a plurality of elements.

Meanwhile, the detailed description of the present invention has explained specific embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by a control node for providing a message service in a mobile communication system, the method comprising:
   receiving a first message from a user equipment (UE);
   transmitting the first message to a message delivery center over a first interface;
   determining whether a state of the message service using the first interface is active or inactive, based on whether a transmission of the first message is successful;
   if the state of the message service using the first interface is inactive:
      transmitting detach request information for re-attach of the UE to the UE,
      receiving location tracking information comprising location information of the UE,
      registering the location information in a control server using a second interface, and
      transmitting the message to the message delivery center using the second interface;
   if the state of the message service using the first interface is active:
      transmitting a second message from the UE to the message delivery center over the first interface, and
      identifying one or more second transmission failures of the second message; and
      in case that the number of the one or more second transmission failures exceeds a threshold, transmitting the detach request information for re-attach of the UE to the UE.

2. The method of claim 1, wherein the second interface is an SGs interface which directly connects the control node and the control server.

3. A control node for providing a message service in a mobile communication system, the control node comprising:
   a transceiver; and
   at least one processor operably coupled to the transceiver, wherein the at least one processor is configured to:
      receive a first message from a user equipment (UE),
      transmit the first message to a message delivery center over a first interface,
      determine whether a state of the message service using a first interface is active or inactive, based on whether a transmission of the first message is successful,
      if the state of the message service using the first interface is inactive:
         transmit detach request information for re-attach of the UE to the UE,
         receive location tracking information comprising location information of the UE,
         register the location information in a control server using a second interface, and
         transmit the message to the message delivery center using the second interface,
      if the state of the message service using the first interface is active:
         transmit a second message from the UE to the message delivery center over the first interface, and
         identify one or more second transmission failures of the second message, and
         in case that the number of the one or more second transmission failures exceeds a threshold, transmit the detach request information for re-attach of the UE to the UE.

4. The control node of claim 3, wherein the first interface is an SGd interface which directly connects the control node and the message delivery center.

5. The control node of claim 3, wherein the detach request information is transmitted to the UE to switch from the message service using the first interface to the message service using the second interface.

6. The control node of claim 3, wherein the message service using the first interface is enabled or disabled by an operator.

7. The control node of claim 3, wherein the second interface is an SGs interface which directly connects the control node and the control server.

8. The method of claim 1, wherein the first interface is an SGd interface which directly connects the control node and the message delivery center.

9. The method of claim 1, wherein the detach request information is transmitted to the UE to switch from the message service using the first interface to the message service using the second interface.

10. The method of claim 1, wherein the message service using the first interface is enabled or disabled by an operator.

* * * * *